United States Patent [19]

Uyeda et al.

[11] 4,260,287
[45] Apr. 7, 1981

[54] PORTABLE REEL PIPELAYING METHOD

[75] Inventors: Stanley T. Uyeda; John Cha, both of Orange, Calif.

[73] Assignee: Santa Fe International Corporation, Alhambra, Calif.

[21] Appl. No.: 909,260

[22] Filed: May 24, 1978

[51] Int. Cl.³ .................. B63B 35/04; F16L 1/00
[52] U.S. Cl. .................. 405/168; 242/54 R; 72/161
[58] Field of Search .............. 405/166, 168, 158, 159, 405/160, 161, 162, 163, 164, 165, 173; 114/65 A, 65 R, 76, 78, 254; 115/34 R; 242/54 R; 72/161

[56] References Cited

U.S. PATENT DOCUMENTS

| Re. 28,410 | 5/1975 | Cox et al. ............ 405/172 X |
| 3,237,438 | 3/1966 | Tesson .................. 405/168 |
| 3,372,461 | 3/1968 | Tesson .................. 405/168 |
| 3,512,367 | 10/1970 | McLallen . |
| 3,589,580 | 6/1971 | Smulders ............. 405/158 X |
| 3,630,461 | 11/1971 | Sugasti et al. . |
| 3,641,778 | 2/1972 | Gibson . |
| 3,680,342 | 8/1972 | Mott et al. . |
| 3,712,100 | 7/1973 | Key et al. . |
| 3,722,775 | 3/1973 | Sarracino et al. ......... 405/168 X |
| 3,855,835 | 12/1974 | Tisdale et al. . |
| 3,872,680 | 10/1975 | Nicholson et al. . |
| 3,982,402 | 9/1976 | Lang et al. . |

FOREIGN PATENT DOCUMENTS 601103 7/1948 United Kingdom .

Primary Examiner—Dennis L. Taylor
Attorney, Agent, or Firm—LeBlanc, Nolan, Shur & Nies

[57] ABSTRACT

A method for laying a substantially continuous length of pipe on the sea bottom from a carrier vessel, in which a pipe carrying reel is rotatably mounted on the carrier vessel, pipe straightening means are mounted to the carrier vessel downstream of the reel in the direction of unspooling for movement in a direction substantially parallel to the rotational axis of the reel, and pipe guide means are mounted to the carrier vessel downstream of the straightener means in the direction of pipe unspooling for movement in a direction substantially parallel to the rotational axis of the reel, wherein the method comprises the steps of rotating the reel in a direction to unspool the pipe and maintain a substantially constant dynamic braking force on the reel to maintain tension on the pipe as it is unspooled.

4 Claims, 18 Drawing Figures

FIG. 3B
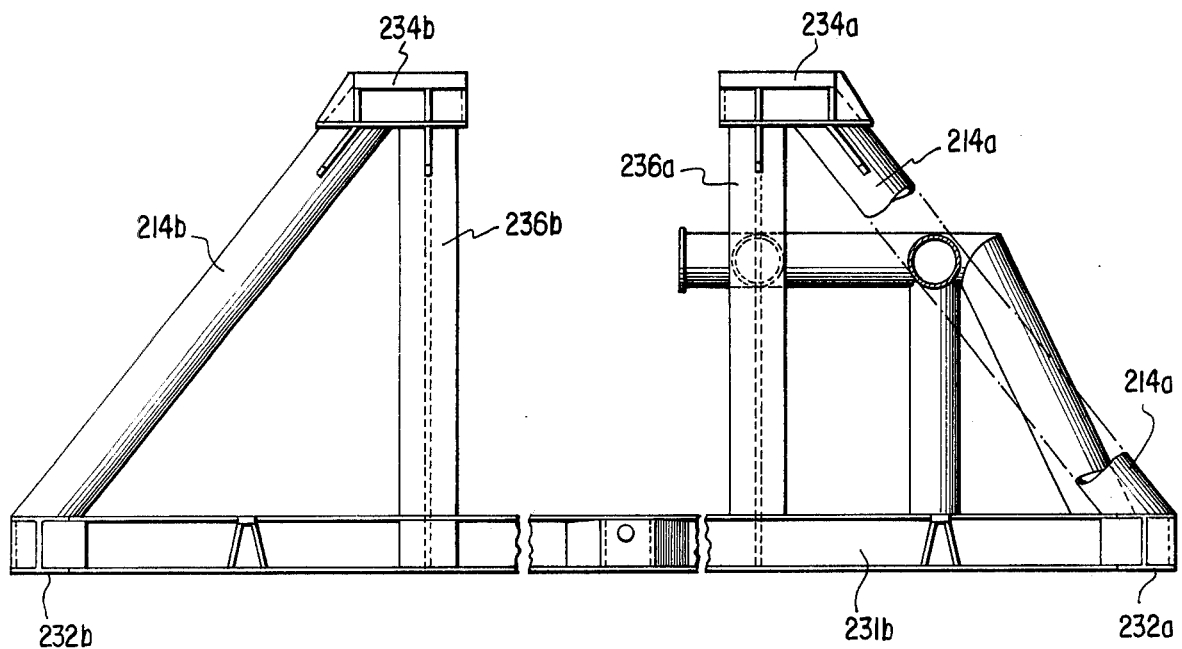
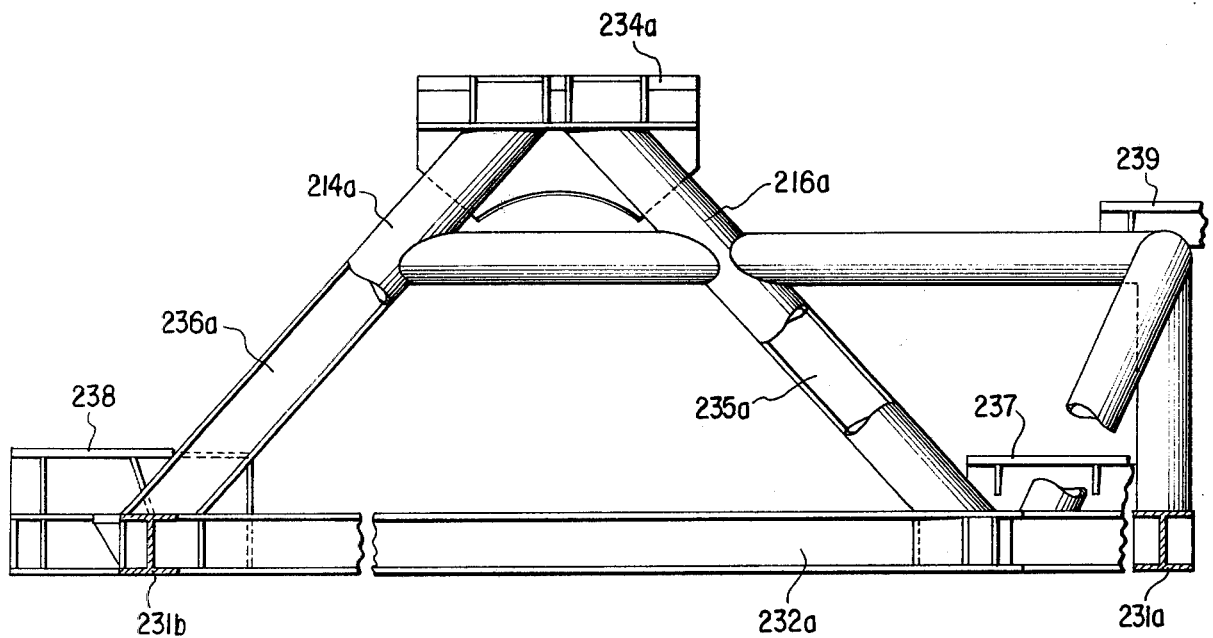
FIG. 3C

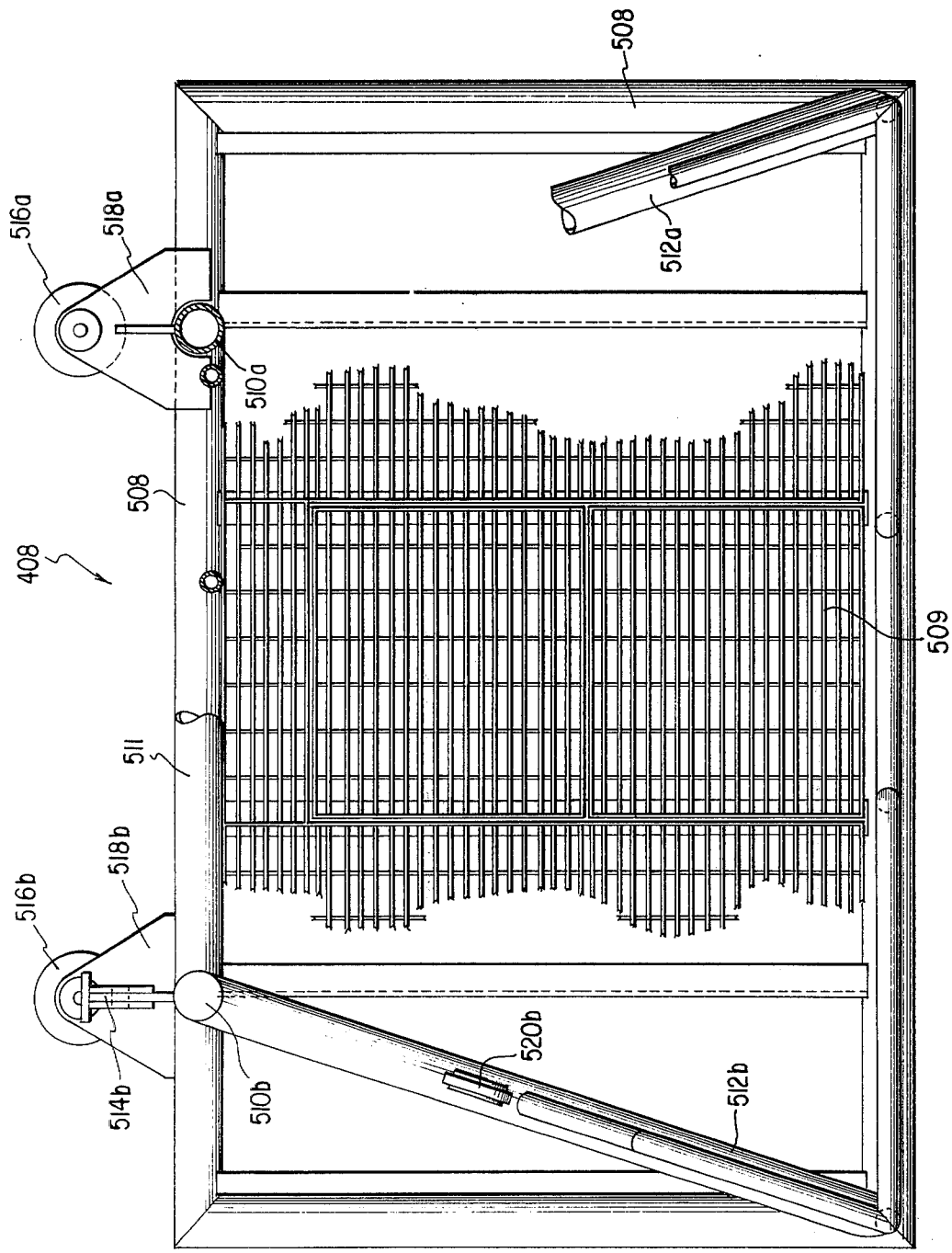

PORTABLE REEL PIPELAYING METHOD

BACKGROUND OF THE INVENTION

The apparatus and method of this invention relates to a portable reel system. The system of this invention has been specifically designed for installation and use on supply boats, drillships, and any other vessel (advantageously self-propelled), having sufficient clear-deck area to accommodate the combination of structural assemblies making up the reel pipelaying system described hereunder.

More particularly, the present invention relates to a reel pipelaying system mounted on the clear-deck area to a suitable carrier vessel (preferably self-propelled) so that the carrier vessel, for example, a supply boat, can be used to lay pipelines to and from offshore drilling platforms and/or storage tanks and/or terminal locations and/or sub-sea well completion units. For convenience of description, and since an operational system has been successfully mounted on a supply vessel, reference hereunder will sometimes be made to a supply boat as one specific carrier vessel.

As used in the present description, "supply boats" are sometimes referred to in the offshore oil industry as "supply vessels" and/or "tug/supply vessels"; they are characterized by a generally flat, continuous on-deck cargo-carrying space between the superstructure and the stern and are primarily used for carrying supplies, equipment, and personnel between a shore base and an offshore platform or rig. Supply boats generally have dimensions and cargo capacities within the following ranges:

Length: 170 feet–225 feet
Gross Registered Tonnage (G.R.T.): 450T–1300T
Continuous On-Deck Cargo Space Between Superstructure and Stern: 2300–4800 sq. ft.
On-Deck Cargo Capacity Between Superstructure and Stern: 300–700T Supply vessels as defined above and as generally referred to in the present description are exemplified in catalogs of the following representative suppliers of such vessels:

(1) Smit-Lloyd:
1977 Catalog of 16 pages, entitled "ANYWHERE, ANYTIME, ANYHOW" with picture of supply boat "Smit-Lloyd 104" on front cover;

(2) Maersk:
1973 Catalog of 12 pages, entitled "Maersk Supply Service/A. P. Moeller" and describing three supply boat types;

(3) Offshore Supply Association, Ltd. (OSA):
1976 Catalog of 8 pages, entitled "Actions Speak Louder Than Words", and bearing legend on back cover: "Printed in West Germany, November 1976".

Another type of carrier vessel for which the reel pipelaying system of this invention may be suitable is the so-called "drill ship"; such vessel is generally a self-propelled ship mounting a drilling tower or rig. The drilling tower may be of the center-line type, in which drilling is done through a well in the center of the ship; an alternative construction has the drilling rig cantilevered over the side of the vessel. Examples of drill ships are shown in Howe, R. J., "The Evolution of Offshore Mobile Drilling Units", Ocean Industry, 1966. Drill ships of either type and having sufficient clear-deck space to mount the combination of elements of the reel pipe-laying system of this invention, may be advantageously used to combine several offshore operations. Specifically, when the drill ship has completed its hole into an oil reserve, the same ship can then lay pipe between the sub-sea well completion and collection point, such as a storage tank.

Historically, the technique of laying undersea fluid-carrying pipelines had its rudimentary beginnings in England in the 1940's. In the summer of 1944, 3" nominal bore steel tubes, electrically flash-welded together, were coiled around floating drums. One end of the pipe was fixed to a terminal point; as the floating drums were towed across the English Channel, the pipe was pulled off the drum. In this manner, pipeline connections were made between the fuel supply depots in England and distribution points on the European continent to support the allied invasion of Europe. (See Blair, J. S., "Operation Pluto: The Hamel Steel Pipelines", Transactions of the Institute of Welding, February 1946.)

The broad concept of reel pipelaying was also disclosed in British Pat. No. 601,103 (Ellis), issued Apr. 28, 1948, wherein it was suggested that lengths of pipe be joined together at the manufacturing plant and coiled onto a drum, mounted on a barge or ship; the loaded barge would then be moved to the desired marine location and the pipe unwound from the drum by fixing one end of the pipe and towing the barge away from the fixed location.

While the concepts described in British Pat. No. 601,103 and those actually used in Operation Pluto were adequate for wartime purposes, no known further development work or commercial use of the technique of laying pipe offshore from reels was carried out after World War II. After a hiatus of about fifteen years, research into the reel pipelaying technique was renewed and was carried on by Gurtler, Hebert & Co., Inc., of New Orleans, La; by 1961, Gurtler, Hebert had sufficiently advanced the reel pipelaying technique to make it a commercially acceptable and viable method of laying pipe in the offshore petroleum industry, able to compete with the traditional stovepiping technique. The first known commercial pipelaying reel barge, called the U-303, was built by Aquatic Contractors and Engineers, Inc., a subsidiary of Gurtler, Hebert, in 1961. The U-303 utilized a large vertical axis reel, permanently mounted on a barge and having horizontally oriented flanges (generally referred to in the trade as a "horizontal reel"). A combined straightener-level winder was employed for spooling pipe onto the reel and for straightening pipe as it was unspooled. The U-303 first laid pipe commercially in September, 1961, in the Gulf of Mexico off the coast of Louisiana and was used successfully during the 1960's to lay several million linear feet of pipe of up to 6" diameter. The U-303 reel pipelaying barge is described in U.S. Pat. No. 3,237,438 (Tesson) and U.S. Pat. No. 3,372,461 (Tesson), both assigned to the assignee of the invention hereof.

The successor to the U-303, currently in use in the Gulf of Mexico and known in the trade as the "Chickasaw", also utilizes a large horizontal reel, permanently mounted to the barge such that it is not readily movable from one carrier vessel to another. Various aspects of "Chickasaw" are described in the following U.S. Patents, all assigned to the assignee of the invention hereof:

| | |
|---|---|
| Sugasti, et al. | No. 3,630,461 |
| Gibson | No. 3,641,778 |

| Mott, et al. | No. 3,680,432 |
| Key, et al. | No. 3,712,100 |

Commercial reel pipelaying techniques require the use of certain pipe handling equipment in addition to the reel. Among such pipe handling equipment essential to any commercial reel pipelaying system is a straightener mechanism. This may take the form of a series of rollers or tracks, or any other arrangement which imparts sufficient reverse bending force to the pipe to remove residual curvature so that after unspooling, the pipe will lay substantially straight on the sea bottom. No such pipe-conditioning apparatus was used in Operation Pluto or contemplated by the Ellis British Patent.

U.S. Pat. No. 3,982,402 (Lang, et al.) describes an apparatus for laying pipe from a vertical reel in which the pipe conditioning apparatus is pivotable to adjust the lift-off angle of the pipe relative to the horizontal (e.g., the deck of a ship) as a function of the water depth in which the pipe is being laid. This has distinct commercial advantages, especially where the reel pipelaying system is incorporated into a self-propelled ship, such as that of the present invention, capable of traveling to different job sites, having different pipe size and/or lay depth requirements.

The design of the reel and the entire system of this invention was dictated (1) by the desire to provide a completely self-contained vertical reel pipelaying system which can readily and economically be transferred from one carrier vessel to another, and (2) by the requirements of supply boats which are presently envisioned to be the principal carrier vessels.

Known prior vertical reel systems have had a relatively high center of gravity; using such known systems on a supply boat could increase the overall KG of the boat to a point where it exceeds the stability limits of the vessel.

CG of a reel is substantially co-incident with its rotational axis; thus, the larger the reel diameter at the flanges, the higher will be its CG. The minimum hub diameter, however, is dependent on the largest diameter pipe to be spooled (and vice versa); a reel designed to spool up to 6" diameter pipe must have a larger hub radius than one designed to spool a maximum of 4" diameter pipe.

The reel pipelaying system of this invention, including the reel, the straightener, the pipe guide and their respective support assemblies, was designed to have a low CG while maximizing the amount of pipe which can be spooled for best commercial advantage.

SUMMARY OF THE INVENTION

In essence, this invention comprises a portable reel pipelaying system for laying a continuous length of pipe on the sea bottom. A pipe-carrying reel is adapted to be mounted to a sufficiently large clear deck area of a carrier vessel. Means are provided for driving the reel in a first direction for spooling pipe onto the reel and for exerting a desired braking action on the reel while unspooling pipe from the reel in a second direction to maintain the unspooled pipe under desired tension. A straightener support assembly is adapted to be mounted to the carrier vessel downstream of the reel in the direction of pipe unspooling; pipe straightening means are movably mounted to the straightener support assembly; and straightener drive means are housed in the straightener support assembly for driving the straightening means in a direction substantially parallel to the rotational axis of the reel to level wind pipe being spooled onto the reel and to substantially straighten pipe being unspooled from the reel. Finally, pipe guide means are adapted to be mounted to the carrier vessel downstream of the straightener support assembly in the direction of pipe unspooling and are movable in a direction substantially parallel to the rotational axis of the reel to guide pipe into the water as it is being unspooled.

More specifically, this invention comprises a portable reel pipelaying system for laying a continuous length of pipe on the sea bottom from a supply boat or similar carrier vessel. A pipe carrying reel, preferably having a hub diameter large enough to spool up to 6" O.D. pipe without exceeding API ovality limitations is mounted to the deck of the supply boat such that the axis of rotation of the reel lies in a plane substantially transverse to the longitudinal axis of the supply boat. Drive means are provided for driving the reel in a first direction toward the bow of the supply boat for spooling pipe on the reel and for exerting a desired braking action on the reel while unspooling pipe from the reel in a second direction toward and over the stern of the supply boat to maintain the unspooled pipe under desired tension. A straightener support assembly movably mounts pipe straightener means to the deck of the supply boat sternward of the reel. Straightener drive means are housed in the straightener support assembly for driving the straightening means in a direction substantially parallel to the rotational axis of the reel to level wind pipe being spooled onto the reel toward the bow of the supply boat and to substantially straighten pipe being unspooled from the reel. Finally, pipe guide means are mounted to the deck of the carrier vessel sternward of the straightener support assembly and are movable across the deck of the supply boat in a direction substantially parallel to the rotational axis of the reel to guide pipe into the water after it has been unspooled and straightened over the stern of the supply boat.

This invention also comprises a method for laying a substantially continuous length of pipe on the sea bottom from a carrier vessel, in which a pipe carrying reel is rotatably mounted on the carrier vessel, pipe straightener means are mounted to the carrier vessel downstream of the reel in the direction of unspooling for movement in a direction substantially parallel to the rotational axis of the reel, and pipe guide means are mounted to the carrier vessel downstream of the straightener means in the direction of pipe unspooling for movement in a direction substantially parallel to the rotational axis of the reel; in essence the method comprises the steps of rotating the reel in a direction to unspool the pipe and maintaining a substantially constant dynamic braking force on the reel to maintain tension on the pipe as it is unspooled.

More particularly, the method comprises the steps of rotating the reel in a direction to unspool the pipe during a lay operation; passing the pipe through the straightener means after it is unspooled to impart a bending force on the pipe sufficient to substantially straighten the pipe; passing the pipe through the guide means after the pipe exits the straightener means and before it enters the water; moving the straightener means and pipe guide means across the deck of the supply boat in a direction substantially parallel to the rotational axis of the reel to maintain the pipe path through the straightener and guide means in substantial alignment with the departure point of the pipe from the reel; and maintaining a substantially constant dynamic braking force on the reel to maintain tension on the pipe as it is unspooled.

BRIEF DESCRIPTION OF THE DRAWING

FIG. 3B is an elevation (looking forward) of the reel support structure; FIG. 3C is a starboard side elevation of the reel support structure;

FIG. 6C is a plan view of the traveling work platform;

FIGS. 3–7 are taken from construction layout drawings and are drawn substantially to scale. Within each of these figures, the component parts or elements are substantially in proportion.

DESCRIPTION OF THE PREFERRED EMBODIMENT

Figure 1:
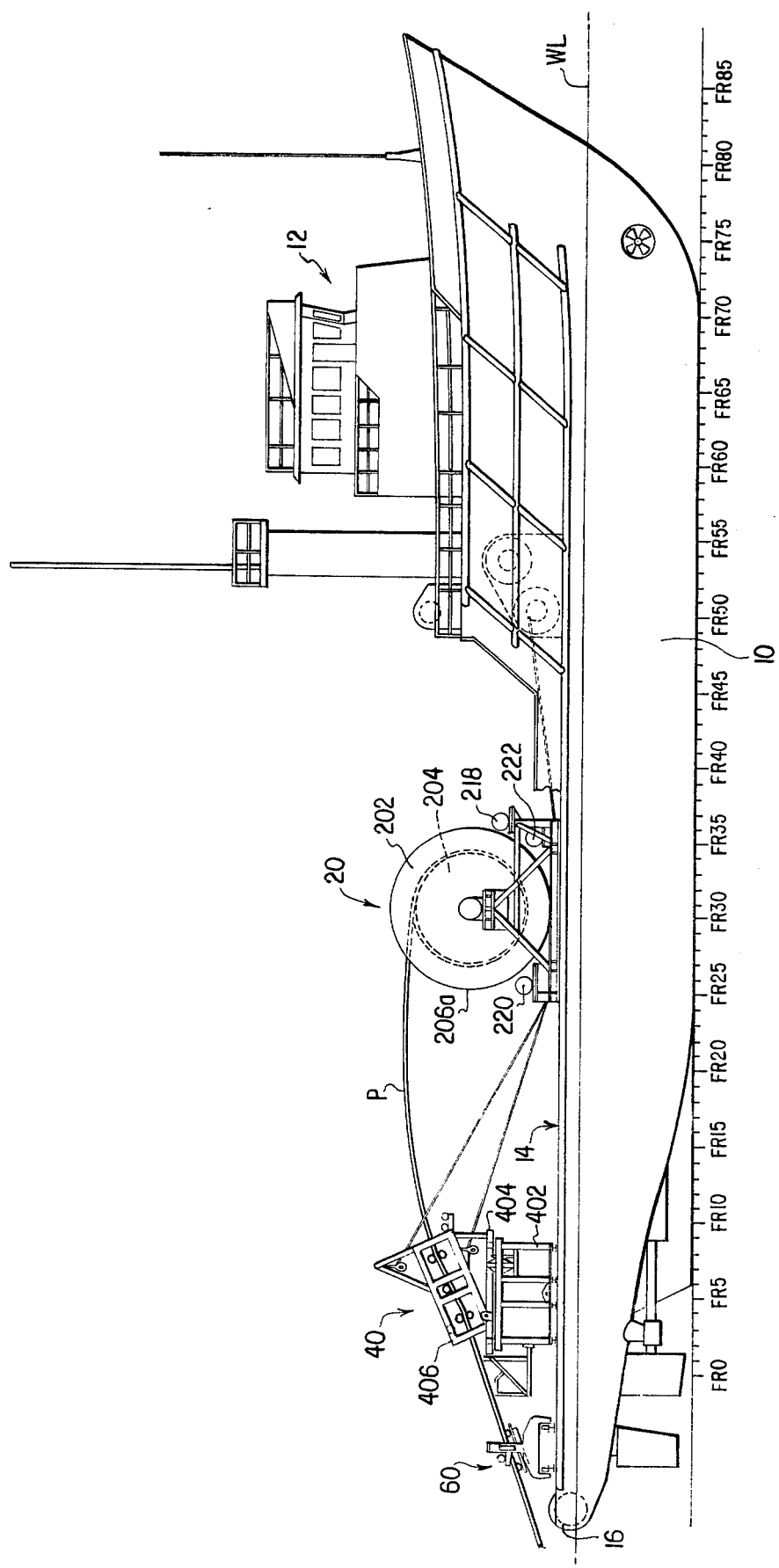
FIG. 1 shows a side elevation typical of a carrier vessel, such as a supply boat, mounting the pipelaying reel system of this invention.
Figure 2:
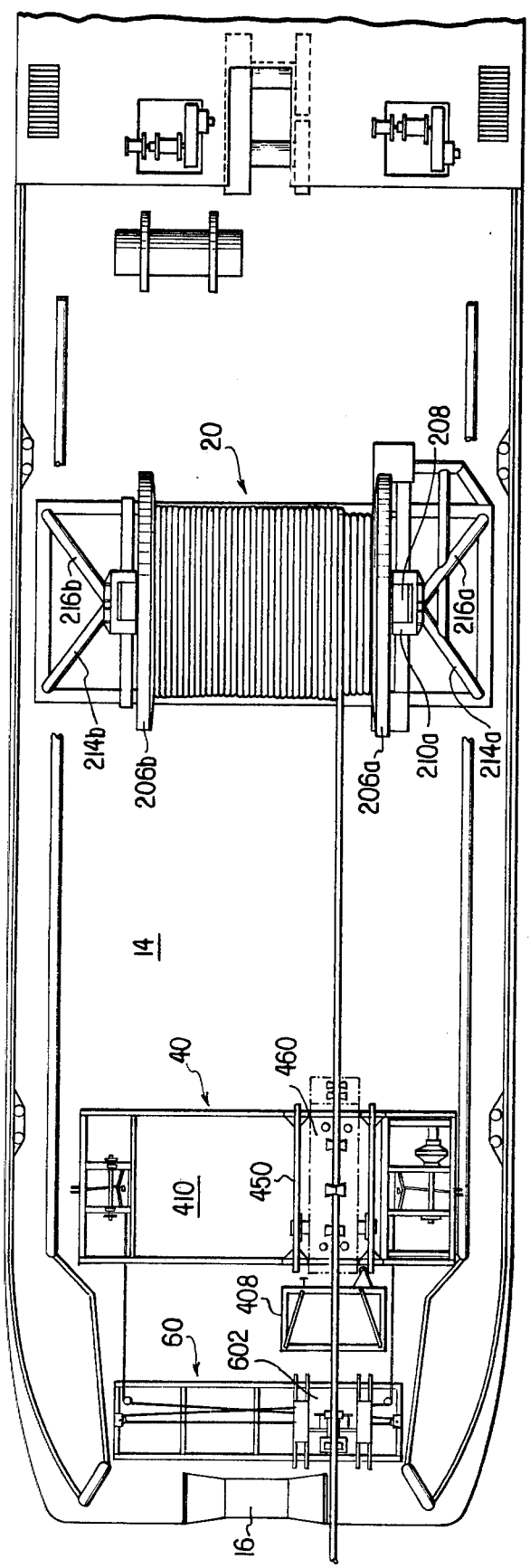
FIG. 2 is a top plan view of the cargo deck area of the supply boat of FIG. 1 mounting the pipelaying reel system of this invention.

General Arrangement (FIGS. 1-2)

FIG. 1 is a side elevation of a typical supply boat mounting the portable reel pipelaying system of this invention. Such supply boats have a hull, generally designated 10, a superstructure generally designated 12 and a relatively flat, unobstructed deck cargo area 14. The forward portion of the supply boat (e.g., forward of frame FR-45) carries the superstructure 12 and has a relatively high freeboard. This forward portion of the supply boat typically has little or no cargo-carrying deck space; crew and passenger accommodations are generally located in this forward portion of the vessel.

The rear portion of the supply boat (e.g., from frame FR 45 to the stern of the vessel shown) has a generally flat unobstructed deck area with a low freeboard design. Typical deck cargos for such supply boats include bulky equipment and supplies required on offshore drilling platforms, e.g., pipe, mud materials, etc. Another feature often found on supply boats is a large stern roller 16 which facilitates hauling large anchors (e.g., as part of semisubmersible drilling rig anchoring systems) onto or off the supply boat's cargo deck 14.

The apparatus of this invention comprises three principal component sections: a reel and its associated support system, generally designated 20; a level winder/pipe straightener assembly and its associated support system, generally designated 40, and used for level winding pipe on the reel and straightening pipe as it is unspooled from the reel; and a pipe guide assembly, and its associated support system, generally designated 60, which guides the pipe into the water after the pipe leaves the straightener assembly.

The reel assembly 20 comprises a reel 202 having a hub 204, of a radius $R_h$, and a pair of end flanges 206; the hub 204 and flanges 206 are carried by a central shaft 208 which defines the rotational axis of the reel. The respective ends of shaft 208 seat in bearings 210 and the entire assembly is supported on a framework skid 212 through bracing members 214, 216. One or more (e.g., three as shown) reel drive motor assemblies 218, 220, and 222 are also supported on skid 212. The skid 212, carrying reel 202 is shown secured to the cargo deck 14 of a supply boat.

The level winder/straightener assembly 40 is shown mounted to the supply boat cargo deck 14 aft of the reel assembly 20. The level winder/straightener assembly comprises a base section 410 which advantageously houses the power supply systems for the entire reel pipelaying assembly. A straightener cart 450 rests on top of base 410 and is movable therealong in a direction substantially parallel to the rotational axis of the reel. A straightener mechanism 460 is pivotably mounted to the straightener cart 450 and comprises a three-roll straightener for removing curvature imparted to the pipe when spooling same onto reel 202. A work platform 408 is mounted to the straightener cart 450 and is movable therewith. The work platform 408 is mounted to the sternward side of the cart 450 to enable work (e.g., pipe welding, coating, etc.) to be done on the pipe as it comes out of the straightener.

The pipe guide assembly 60 is secured to the deck aft of the straightener assembly and comprises a group of rollers mounted to a traveling carriage 602 which, in turn, is mounted on tracks for movement across the stern of the supply boat in a direction substantially parallel to the rotational axis of the reel.

In one embodiment, the straightener 460 and cart 450 are mechanically linked with the pipe guide carriage 602. By this arrangement, the straightener and pipe guide assemblies may be positively driven together to maintain the two in substantial alignment with each other and with the pipe entry/exit point onto/off the reel.

FIGS. 1 and 2 show a continuous length of pipe P as it comes off the reel 202, and thereafter passes through the level winder/straightener assembly 40 and through the pipe guide assembly 60 before entering the water.

Details of the several component sections and their operation are described below. Note that, for convenience, the level winder/straightener assembly 40 is sometimes referred to only as the straightener assembly, although it is understood that in the embodiment described here, it is contemplated that assembly 40 performs both level winding and straightening functions.

Reel and Support Assembly 20 (FIGS. 3,4)

Figure 3A:
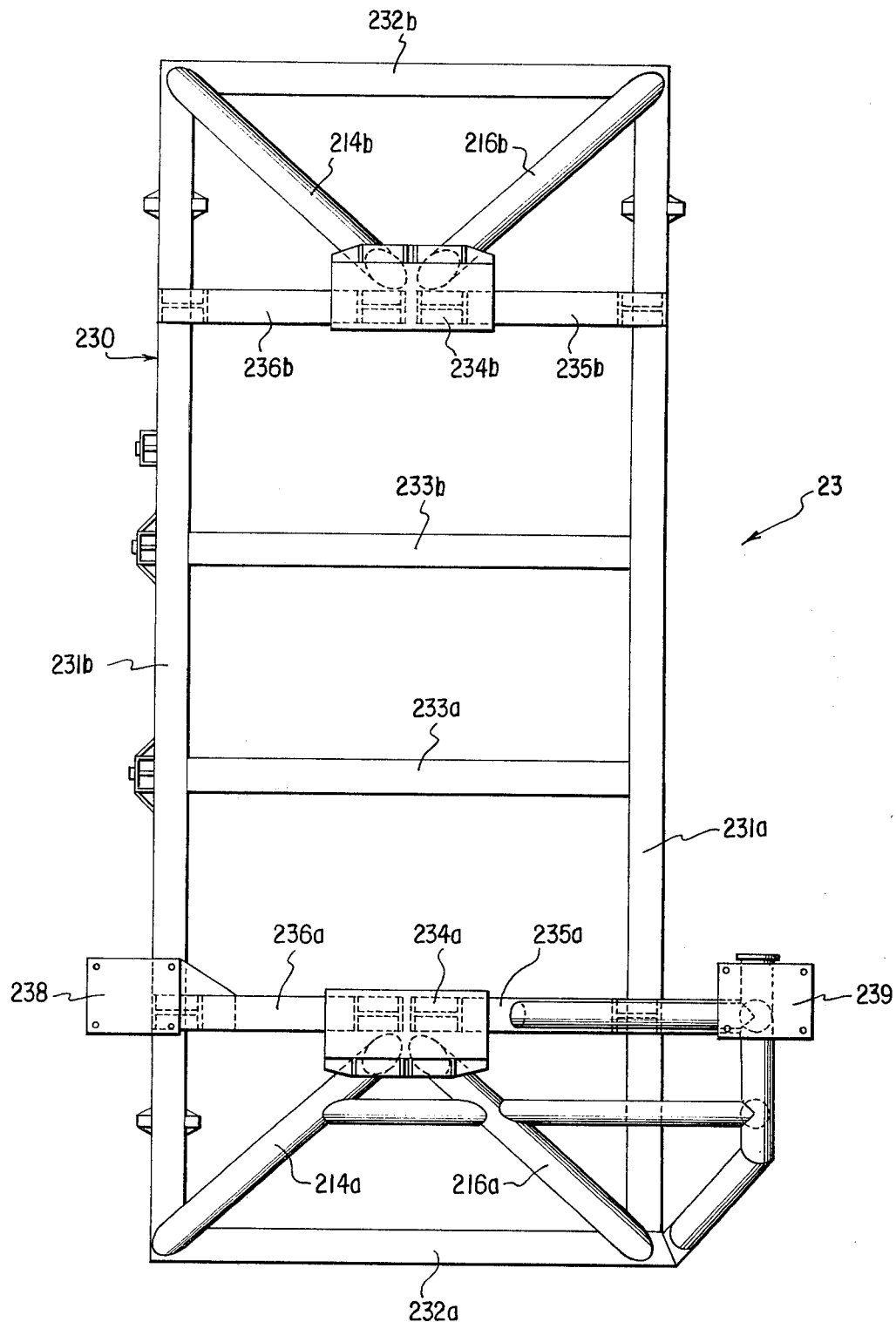
FIG. 3A is a plan view of the reel support structure.

The pipe reel support assembly 23 is shown in detail in FIGS. 3A–C. The support assembly comprises a rectangular base frame 230 having side members 231, end members 232, and intermediate bracing members 233.

The reel bearings 210 rest on bearing plates 234. Each of the bearing plates 234 in turn rests on the upper ends of support members 214, 216, 235, 236. Support members 214 extend from one corner of the base frame 230 upward to the bottom of plates 234 (e.g., member 214a extends from the intersection of members 231b, 232a to the underside of plate 234a) at a vertical angle of about 45° ±15°; for most constructions, this angle is preferably 45°. Support members 216 extend from the adjacent corner of the base frame 230 upward to the bottom of plates 234 (e.g., member 216a extends from the intersection of members 232a and 231a to the underside of plate 234a) at the same vertical angle as support members 214. A projection of members 214, 216, and 232 into the plane of base frame 230 preferably defines an isosceles triangle having a vertex angle (i.e., the angle between legs 214 and 216) of approximately 90°. Support members 235 and 236 extend in opposite directions from bearing plate 234 to side frame members 231b and 231a, respectively, such that projections of support members 235a and 236a into the plane of the base frame 230 lie approximately parallel to end members 232.

The reel support structure 23 also mounts the reel drive motor assembly or assemblies. In the embodiment shown here, the reel 202 is driven by a group of three drive motors 218, 220, 222. The reel drive motors 220 and 222 rest on motor mount support plates 237, 238, respectively, fixed directly to the base frame 230 (as shown in FIG. 3C) by any conventional means. Motor mount support plate 239 is located at an elevated position relative to the main base frame 230, in any conventional manner, for example, by a tubular support framework, as shown in FIGS. 3A–C. In the herein described embodiments, the drive motors are all mounted on the same (starboard) side of the reel support assembly. Alternatively, the motors could be mounted on the port side, or in various combinations, on both sides of the support assembly.

Figure 4A:
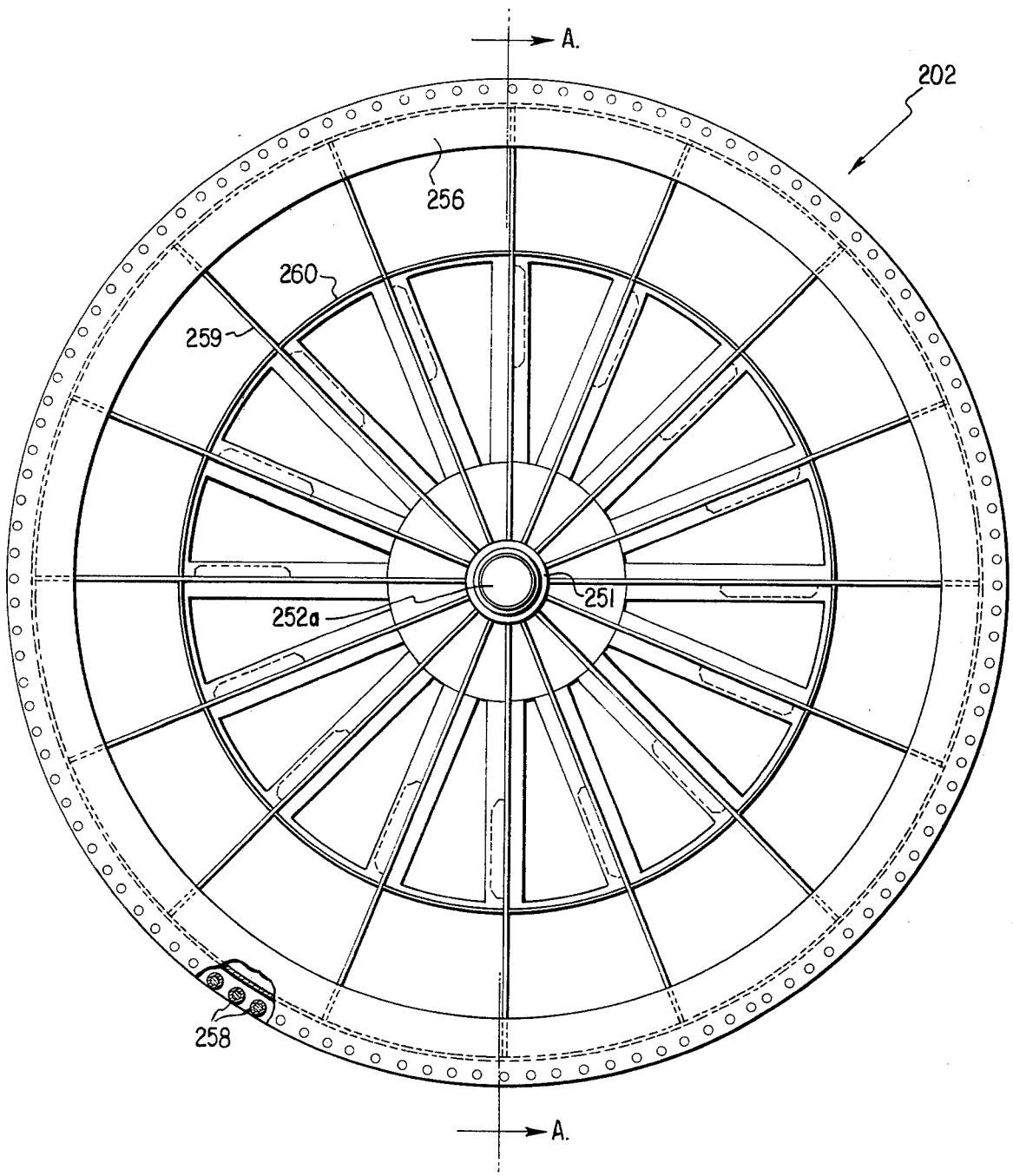
FIG. 4A is a starboard side elevation of the reel.
Figure 4B:
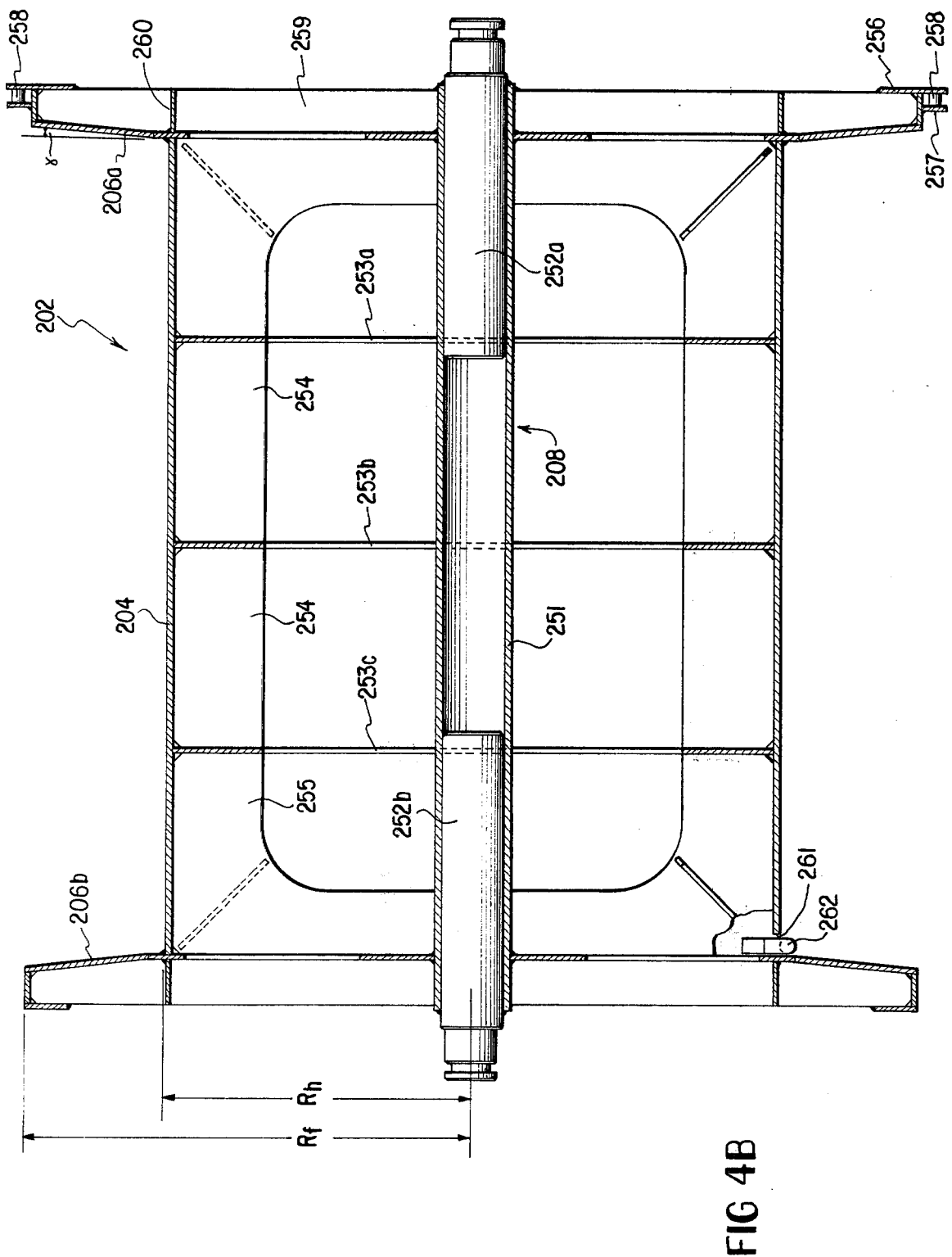
FIG. 4B is a section of the reel through A—A in FIG. 4A.

The reel itself is shown in FIGS. 4A and 4B. The reel 202 has a hub 204 of a radius $R_h$ and a pair of end flanges 206b, each having a flange radius $R_f$. In the preferred embodiment, the shaft comprises an axial pipe 251 extending through the entire reel and protruding outwardly of flanges 206a, 206b. A pair of axially opposite shaft members 252a, 252b are fitted into the opposed end portions of pipe 251; shafts 252 have machined ends which seat in bearings 210. Pipe 251 and shaft members 252a, 252b, together effectively act as a unitary shaft element, generally designated 208, with machined ends which seat in the bearings 210.

A plurality of circumferential stiffening members or rings 253 extend around the interior surface of hub 204 coaxial with shaft 208. Rings 253 are advantageously spaced approximately axially equidistant from each other. A further plurality of longitudinal stiffening members 254 and 255 extend axially along the underside of hub 204 at right angles to annular members 253. Stiffening members 254 extend between adjacent radial ribs 253 at the interior surface of hub 204; stiffeners 255 are corner members and are welded to rings 253, flanges 206, and axial pipe 251. This interior construction of the reel results in a honeycomb shape under the plating of hub 204. Such construction produces a reel with great strength, a quite desirable feature in pipe reel systems of the present invention. The longitudinal stabilizing members 254, 255 distribute the load of multiple pipe wraps evenly on the reel. These members permit the reel to accommodate large back tension forces which may occur under certain conditions, such as when retrieving pipe from the ocean floor.

Flanges 206 are beveled outwardly to define an angle $\gamma$ with a plane perpendicular to the reel axis. At least one of the flanges incorporates a part of the reel drive system; in the preferred embodiment, the starboard flange 206a has welded thereto a circumferential outer plate 256 and a circumferential inner plate 257. A plurality of matching throughholes are formed in plates 256 and 257; roller members 258 are fixed to shafts located in the throughholes and secured, e.g., by cotter pins or the like. Such rollers 258 are equally spaced around the circumference of flange 206a and mate with gears on the reel drive motors.

The flanges 206 are formed by a plurality of radial ribs 259 extending from the axial pipe 251 to the radially outer ends of flanges 206. These radial ribs are preferably equally spaced around the pipe 251 and, in the operative embodiment, the arcuate spacing between adjacent ribs is approximately 22.5°. A circumferential bracing member 260 is provided, preferably co-radial with the hub 204. Preferably, plating is provided on the inner surfaces of the flanges between the flange ends and the hub surface to provide a uniform support surface for end wraps of the pipe.

One or more openings 261 are formed in the hub 204, preferably adjacent one of flanges 206. Such openings are intended to receive an elbow member 262 of a size conforming to the size of pipe to be spooled. If only one opening is used, it should have a diameter slightly greater than the diameter of the largest size to be spooled; alternatively, a hole can be cut in the reel hub or drum for each size pipe to be spooled, each hole having a diameter slightly greater than the diameter of the pipe to be accommodated therein.

The radius of the reel should be large enough to spool at least 4" diameter (nominal) and preferably 6" diameter (nominal) pipe without exceeding maximum limits for ovality as established by the American Petroleum Institute (API). Current API specifications require that for sub-sea oil- or gas-carrying flow lines, the pipe may not be out of round by more than 2%; that is the difference between two mutually orthogonal diameters at a given location should be no greater than 2%.

Figure 5A:
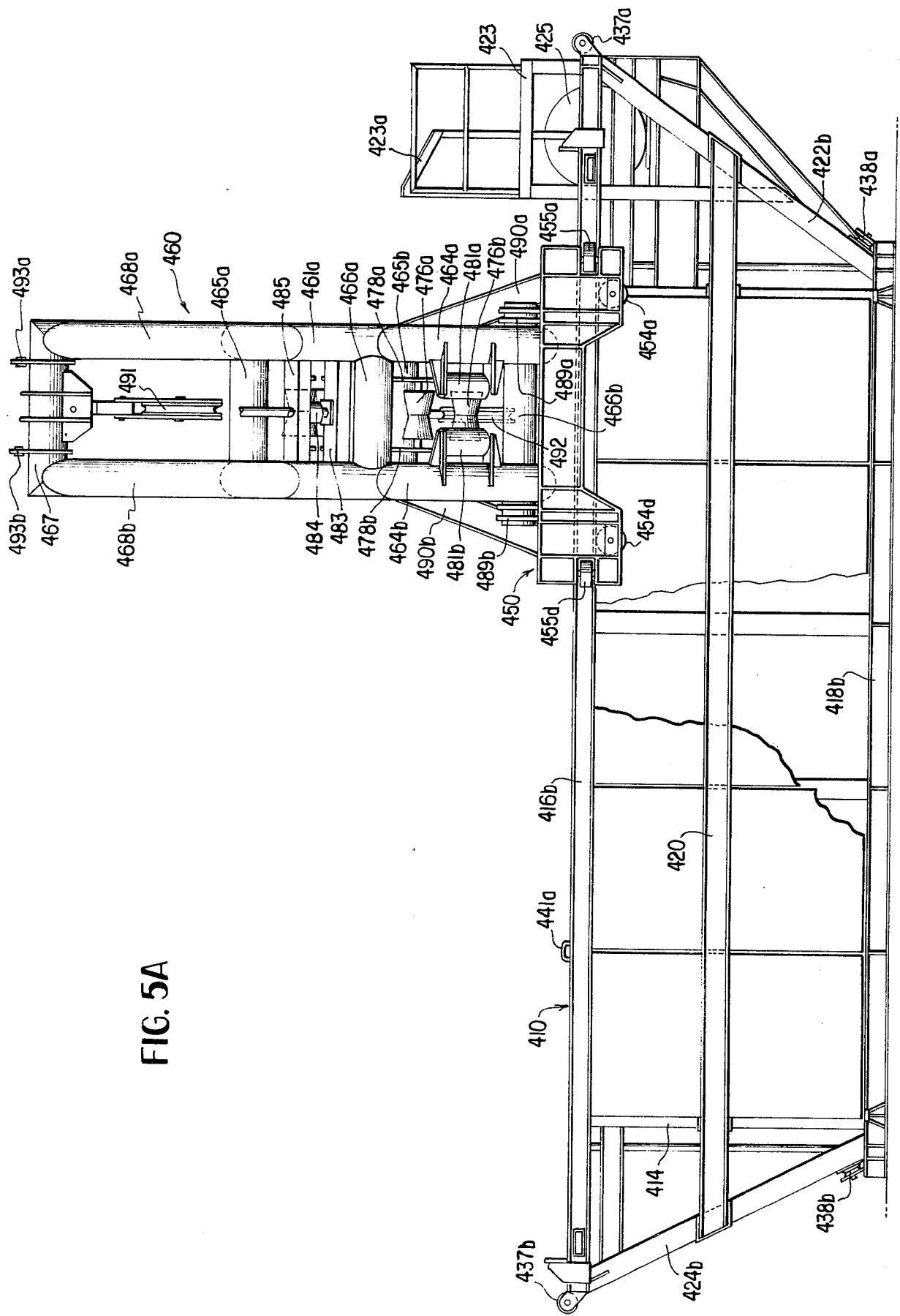
FIG. 5A is an elevation (looking forward) of the straightener assembly, including the straightener mechanism, the cart and the support platform.
Figure 5B:
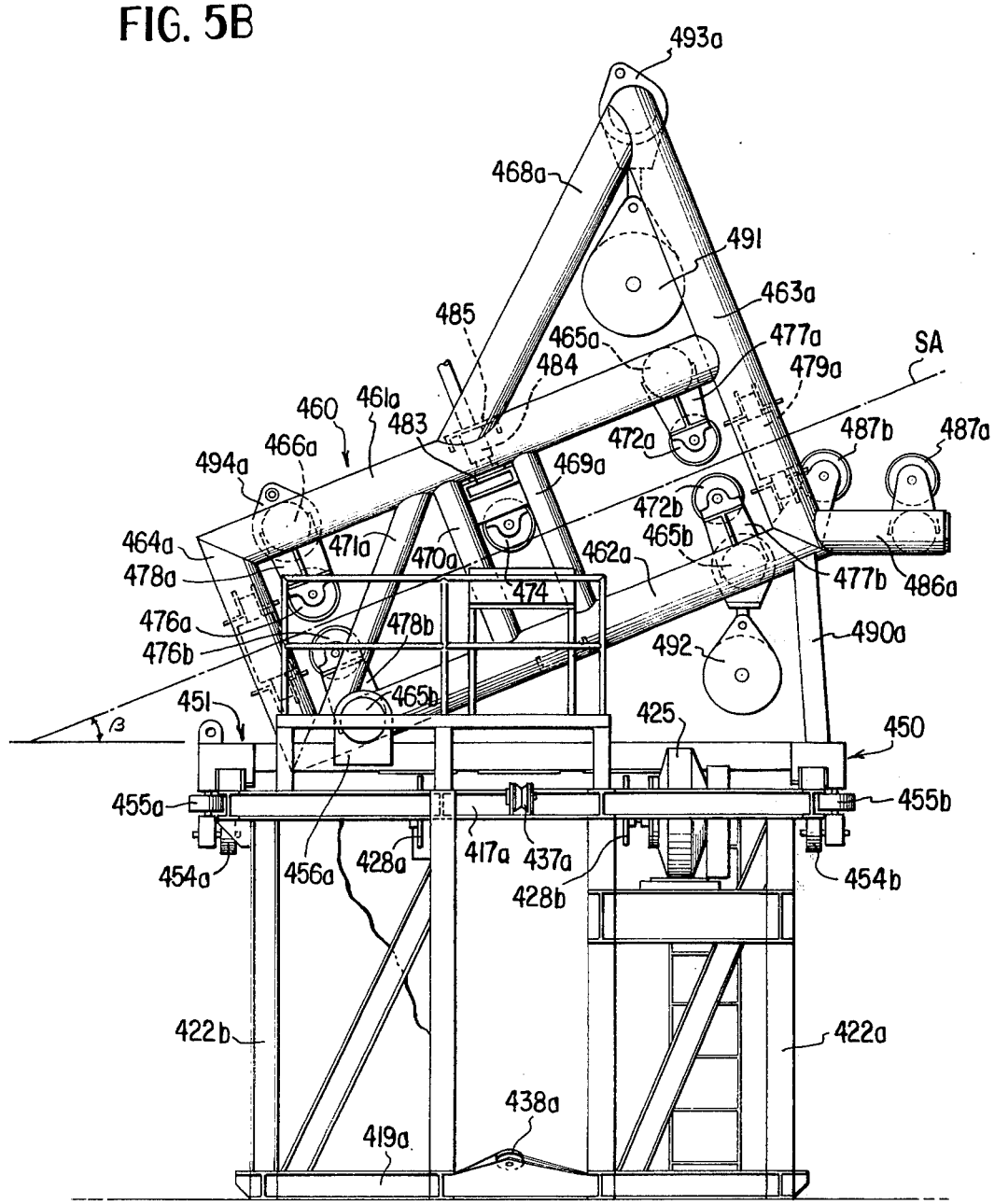
FIG. 5B is a starboard side elevation of the straightener assembly.
Figure 5C:
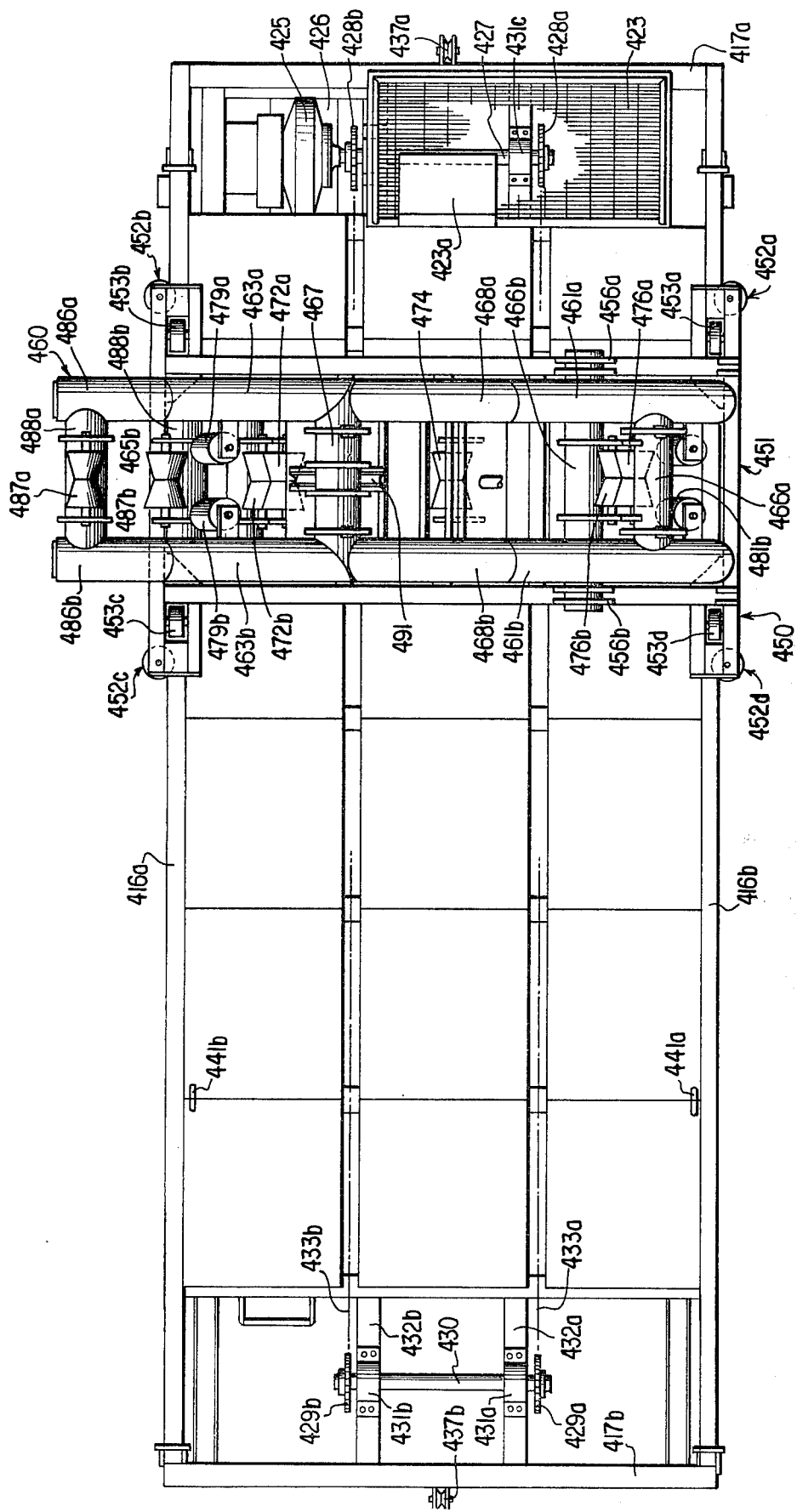
FIG. 5C is a plan view of the straightener assembly.

Level Winder/Straightener Assembly and Support Systems (FIGS. 5A–5C)

The pipe straightening or conditioning apparatus 40 comprises a straightener support platform 410, a movable carriage or straightener cart 450 supported on and movable across the top of platform 410, and a straightener 460 mounted on and movable with cart 450.

The straightener support platform 410 is essentially a closed box-like structure with vertical side walls 412 and vertical end walls 414. These side and end walls are composed of panels some of which are advantageously welded and others of which are bolted to the support platform frame; bolted panels are removable to permit access to the interior of the support platform 410.

The exterior frame of the support platform 410 has a substantially inverted trapezoidal configuration, i.e, top frame members 416 are longer than parallel bottom frame members 418. Each of the transverse top frame members 416 comprises a (preferably) C-shaped guide member or rail, with which the straightener cart 450 cooperates, for guiding the straightener cart 450, and thus, the straightener assembly 460, across the top of the support platform 410. Corresponding pairs of (port and starboard) top and bottom end frame members 417 and 419, respectively, connect the exterior framework members 416 and 418.

A rail or guide member 420 is located approximately intermediate the top and bottom frame members 416b, 418b, respectively. Intermediate rail 420 is supported at its respective ends by angled frame members 422b and 424b, which extend between the extremities of the top and bottom (aft) frame members 426b and 418b. Corresponding angled frame members 422a and 424a extend between the ends of top and bottom (fore) frame members 416a and 418a. Work platform 408, connected to the straightener cart 450, is guided along the support platform 410 by guide rail 420.

The intermediate guide rail 420 preferably comprises a plurality of members so dimensioned that separate individual members are bolted respectively to welded or bolted panels. This permits the bolted panels to be removed with their associated portion of the intermediate guide rail; when the bolted panels are in place, the structure acts effectively as a single guide rail 420.

An operator's platform 423 and operating console 423a are preferably located on one or the other of the starboard and port side extensions of the platform 410, such extensions comprising the area included within the extensions of top frame members 416 beyond the bottom frame members 418. The operator station contains the system controls for operating the reel and level wind/straightener mechanism; such operations will be described in more detail below.

All of the hydraulic and electrical power supplied required for operating the reel pipelaying system of this invention are located within the interior of the straightener platform 410. This arrangement further enhances the portability of the entire system and makes it substantially independent of the power supply capacity of the carrier vessel. When installed on board the carrier vessel, the hydraulic power supply contained in the straightener platform 410 is connected by conventional piping techniques to the reel drive motors 218, 220, 222.

A motor 425, advantageously of the hydraulic drive type, is mounted on a motor support 426 located, for example, in the starboard extension portion of the straightener support platform 410. The motor 425 includes a shaft 427 on which are mounted a pair of sprocket wheels 428. A pair of idler sprocket wheels 429 are mounted on a shaft 430 located on the port extension portion of the straightener support platform. The shafts 427 and 430 are supported by pillow block bearings 431 on adjacent parallel bearing support beams 432. Chains 433 (e.g., 2" roller chain) are passed around the associated pairs of sprocket wheels 428, 429; the respective ends of each of chain 433 are connected to the straightener cart 440. Operation of motor 425 turns shaft 427 and sprockets 428 which, through the chains 433, drive the straightener cart 450 in translational motion across the top of the straightener support platform 410.

A plurality of lifting shackles 441, advantageously four in number (although only two can be seen in the drawing), are located at strategic points on the top of the support platform 410. A lifting cable and bar assembly may be readily attached to the shackles 441 to lift, by means of a crane or the like, the entire straightener assembly, including the support platform 410, cart 450, and straightener mechanism 460 onto or off from the carrier vessel deck as a single unit.

The straightener cart 450 comprises a generally open rectangular frame 451. A roller assembly 452 is located at each of the four corners of said frame 451 for movably supporting the straightener cart 450 on the straightener platform guide members 416. Each roller assembly 452 comprises a pair of horizontal axis rollers 453, 454, which ride on the upper end and lower flanges respectively, of a guide member 416; a vertical axis roller 455 rides in the channel of a guide member 416. This arrangement maintains the straightener cart secured to the platform 410 to prevent movement of the cart in the vertical and fore and aft directions relative to the platform while permitting controlled transverse movement of the cart along the top of the platform 410.

A pair of pivot-mounting assemblies 456 is welded, or otherwise secured, to cart frame 451 for pivotably mounting the straightener assembly 460 to the straightener cart 450.

The straightener mechanism 460 includes a framework (advantageously composed of tubular members) comprising upper and lower fore and aft aligned members 461, 462, and relatively vertically extending end members 463, 464. These port and starboard side frames are rigidly attached to each other by upper and lower fore and aft transverse connecting members 465, 466 (also advantageously of tubular construction).

Relatively vertical frame members 463 extend above the main frame and are connected at their top ends to a transverse (e.g., tubular) bracing member 467, and to diagonal bracing members 468. Additional intermediate bracing members 469, 470, and 471 may also be provided as shown (see, e.g., FIG. 5B).

The straightener mechanism itself comprises three sets of rollers 472, 474, 476. The forward (or first) set of straightener rolls comprises a pair of upper and lower rolls 472a, 472b; the rear (or third) set of rollers likewise comprises a pair of upper and lower rolls 476a, 476b.

Rolls 472 are rotatably mounted through bearing assemblies to rigid brackets 477 which are secured (e.g., by welding) to transverse bracing members 465. Similarly, rollers 476 are rotatably mounted to rigid brackets 478 which are similarly fixed to transverse bracing members 66.

A forward (or first) set of vertical axis guide rollers 479 is fixed by brackets to frame members 463. A sternward (or second) set of vertical axis guide rollers 481 is fixed by brackets to frame members 464. Roller sets 472, 479, and roller sets 476, 481, define the entry/exit portions of the pipe path through the straightener 460.

The intermediate (or second) roller 474 is adjustable in a direction substantially perpendicular to the nominal longitudinal axis of the pipe as it passes through the straightener 460. Roller 474 is mounted by brackets to a box frame 483; box frame 483 is so dimensioned to extend between the support members 469 and 470, such that said support members act as guide means to restrain the box frame 483, and thus roller 474, against movement in the fore and aft direction while permitting movement in the relatively vertical direction. A positioning mechanism 484 (e.g., a Duff Norton jacuator model 1820) is mounted to a transverse support member 485, fixed between frame members 461a and 461b. The positioning mechanism 484 provides for adjustment of roller 474 toward and away from the pipe.

A pair of frame extension members 486 are located at the lower forward end of straightener 460. This frame extension mounts a pair of rollers 487 on respective transverse members 488 similar to the mounting arrangement of rollers 472 and 476. The function of these roller assemblies will be made clear below.

A pair of axially opposite tubular extensions 489 of transverse frame member 466b are provided on straightener frame members 462; these extensions 489 seat in pivot-mounting assemblies 456 for pivotably supporting the stern portion of the straightener 460 on cart 450. The forward end of straightener 460 is supported on cart 450 by substantially vertical support members 490. The lower ends of support members 490 rest on respective corner sections of the straightener cart 450, as shown.

The length of support members 490 may be adjusted to thereby adjust an angle $\beta$; this angle is called the "exit" or "lay" angle and is the nominal angle at which the pipe enters the water. This angle is a function of such things as water depth, tension on the pipe and the physical characteristics of the pipe. For supply boat mounted systems, the lay angle advantageously is in the range of between about 10° and 25°; and preferably is in the range of about 15°–20°.

An upper block 491 is mounted to and hangs down from transverse top member 467; a lower block 492 is mounted to and hangs downwardly from transverse frame member 465b. These provide guide means for winch cables used during pipe spooling and unspooling operations to pull the pipe end aboard the carrier vessel or to lower the pipe end into the water at the end of a laying operation. A pair of forward lifting pads 493 and a pair of rear lifting pads 494 are fixed respectively to transverse frame members 467 and 466a to provide a connection point for lifting cables which may be used to lift the straightener 460 off the support platform 410. By connecting cables to the front pair of lifting pads 493, the straightener 460 may be pivoted about pivot members 489, to thereby enable adjustment of the exit angle $\beta$. Alternative adjustment mechanisms may include hydraulic cylinders located, e.g., in place of support members 490, etc.

Figure 6A:
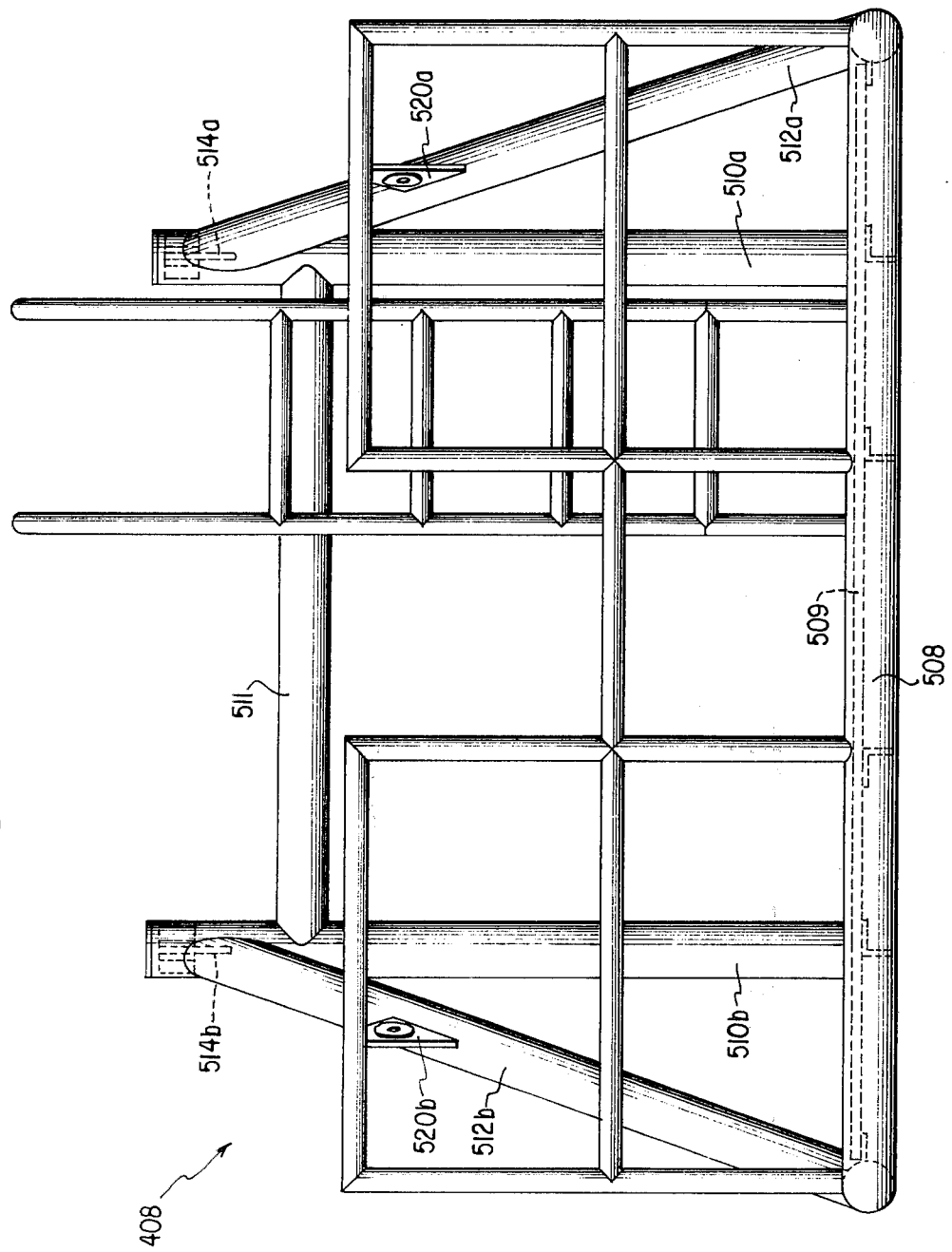
FIG. 6A is an elevation (looking forward) of the traveling work platform mounted to the straightener assembly.
Figure 6B:
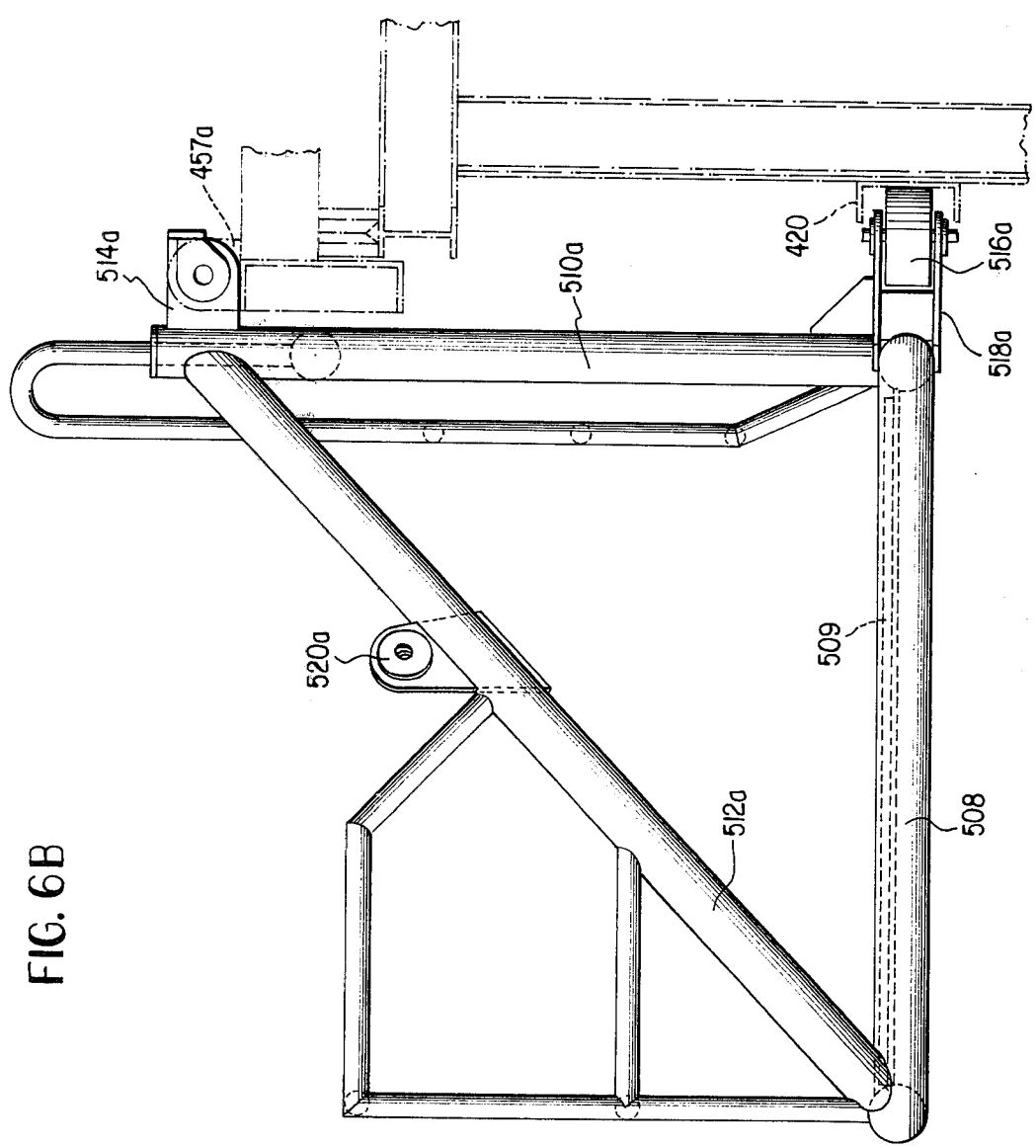
FIG. 6B is a starboard side elevation of the traveling work platform.

Work Platform (FIGS. 6A–6C)

The work platform 408 comprises a (tubular) horizontal frame 508 which supports an open grid floor 509. A pair of front vertical frame members 510 extend upwardly from the floor frame 508 and are connected by a transverse bracing member 511 near their respective top portions. Additional bracing is supplied by diagonal bracing members 512 which extend from the rear corner of the floor frame 508 to the upper part of vertical frame members 510.

A (preferably plate-like) member 514 extends forwardly from each of vertical frame members 510. Members 514 mate with and are sandwiched between corresponding pairs of members 457 located on the frame 451 of straightener cart 450. Members 514 and 457 are secured by pins, bolts, etc. passing through corresponding holes in the respective members 514 and 457.

A vertical axis roller 516 is secured by a roller mounting assembly (e.g., a pair of rigid brackets) to the floor frame 508 at the junction thereof with each of vertical frame members 510. Rollers 516 ride in the channel of rail or guide member 420.

From the above, it will be seen that work platform 408 is secured to straightener cart 450 for transverse movement therewith. It will also be seen that the work platform is readily detachable from the rest of the straightener assembly to permit more compact storage of the straightener assembly 40 for shipping purposes.

A lifting pad 520 is securely affixed (e.g., by welding) to each of diagonal frame members 512 to allow the work platform 408 to be lifted by a crane (or other lifting means) away from the rest of the straightener assembly 40.

Figure 7A:
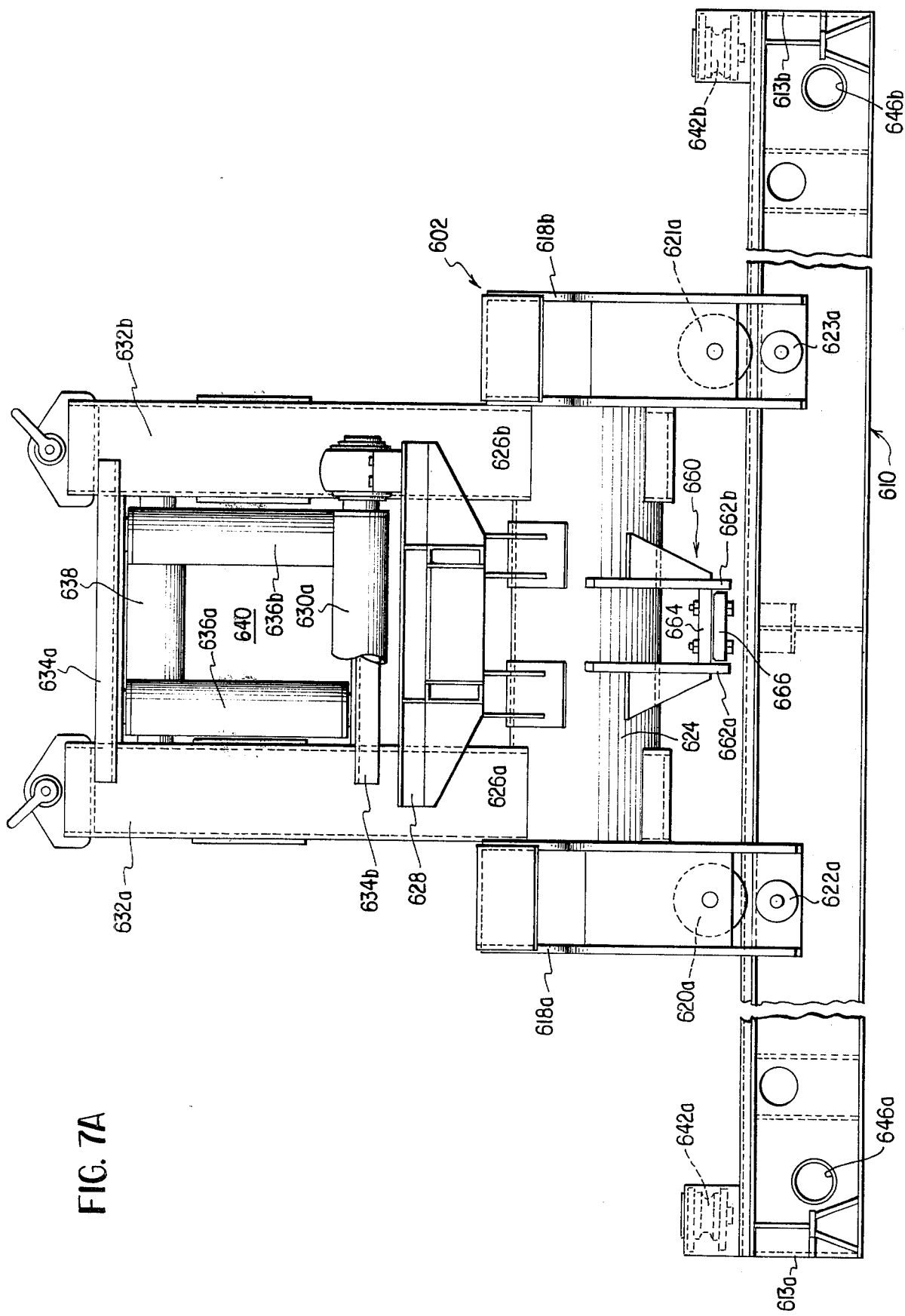
FIG. 7A is an elevation (looking aft) of the pipe guide assembly.
Figure 7B:
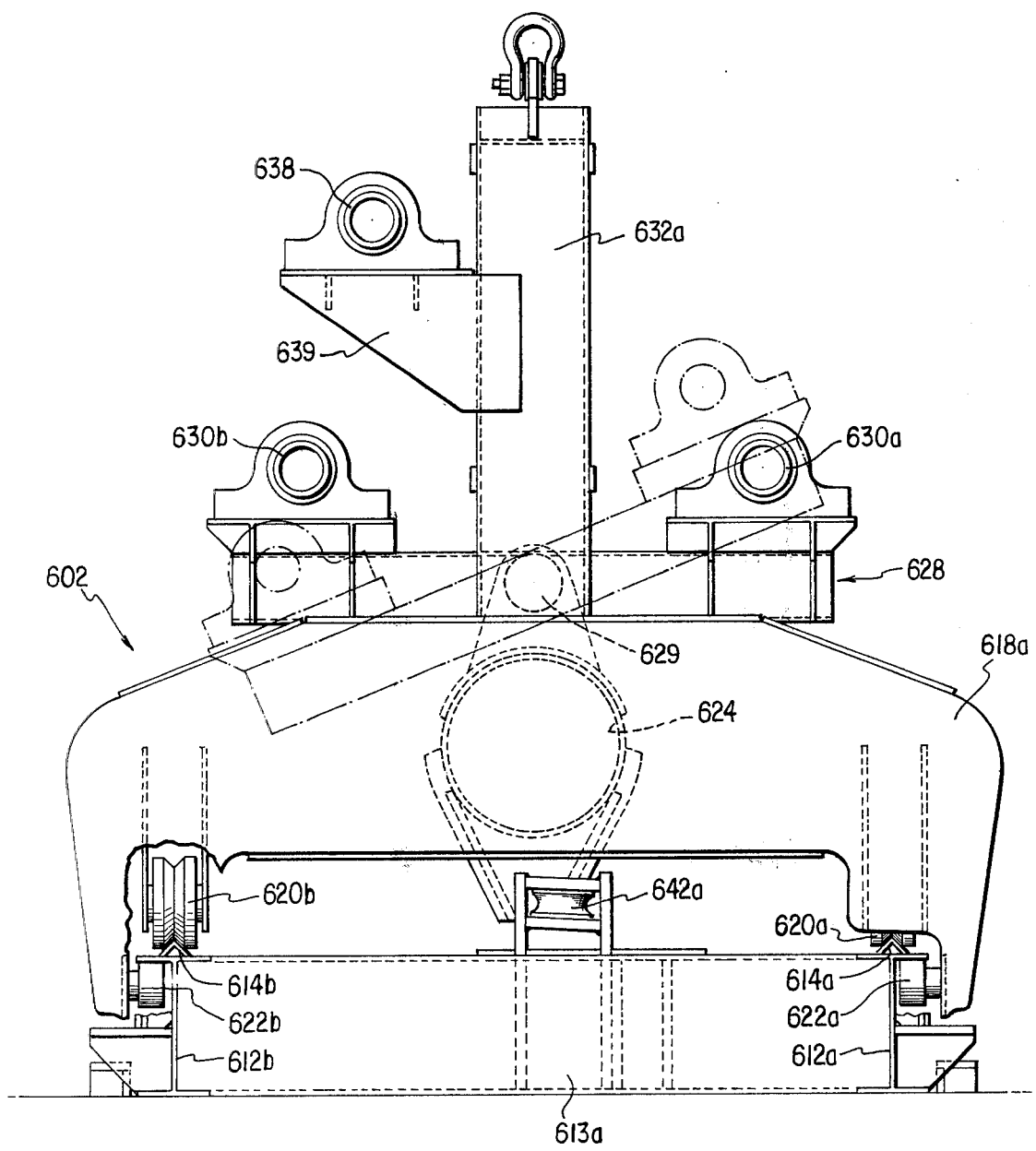
FIG. 7B is a starboard side elevation of the pipe guide assembly.
Figure 7C:
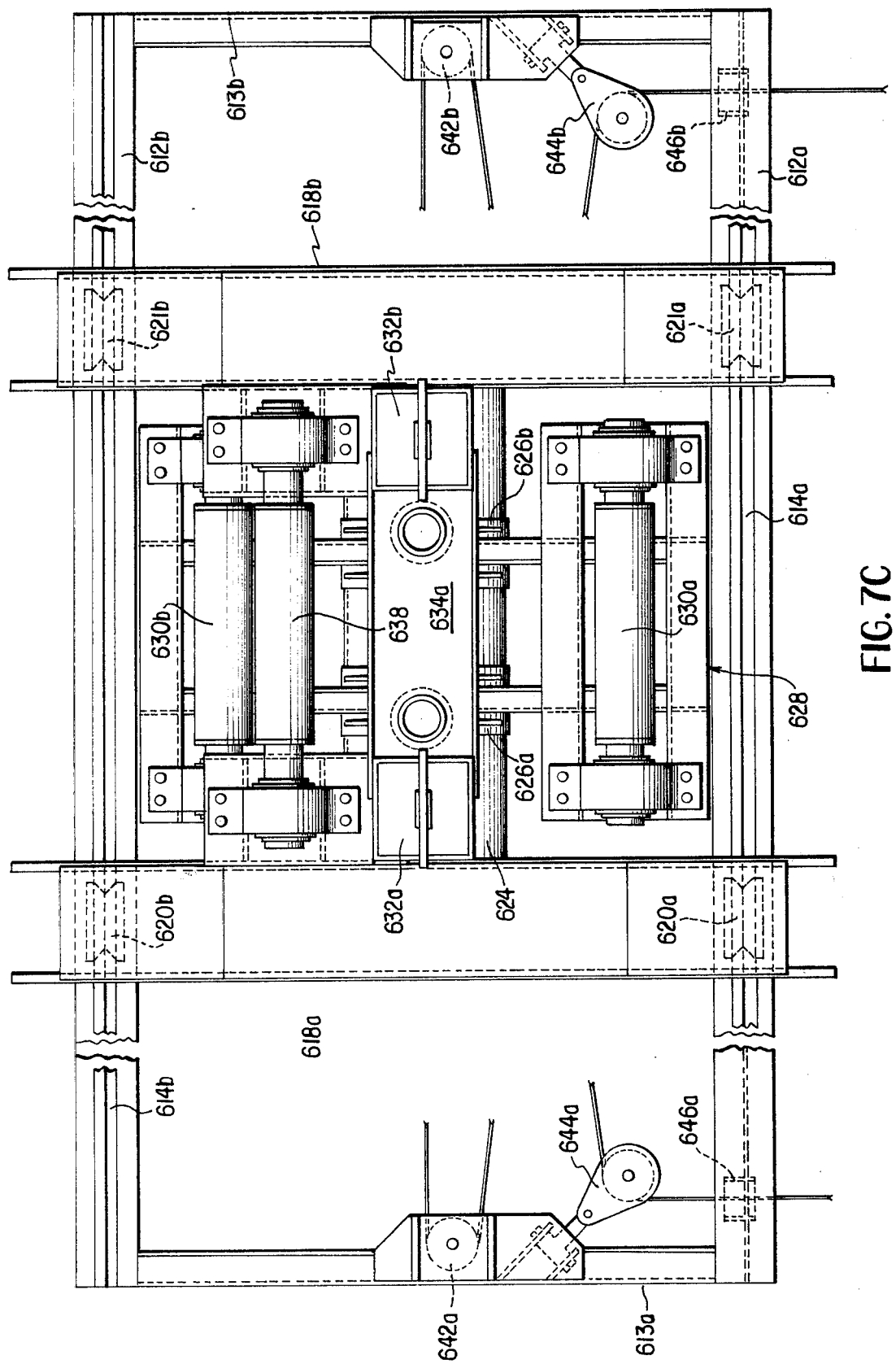
FIG. 7C is a plan view of the pipe guide assembly.

Pipe Guide Assembly (FIGS. 7A–7C)

The pipe guide assembly 60 comprises a roller carriage 602 supported on a frame 610. The frame is advantageously an open box-like frame having fore-and-aft extending end members 611 and longer transverse members 612; at least the longer (transverse) members 612 are advantageously composed of I-beams or T-beams. L-members 614 are secured (e.g., by welding) to the upper faces of beams 612 to define an inverted V-shaped track on each of beams 612.

The pipe guide carriage 602 is supported on and is movable along frame members 612. The carriage 602 comprises a pair of fore-and-aft extending side frames 618a, 618b mounting V-grooved upper guide wheels 620, 621, which mate with and ride on respective tracks 614. Each of carriage frames 618 extends over beams 612 to mount the axles for lower guide wheels 622, 623. Lower guide wheels 622, 623 extend under the top face of beams 612 and cooperate therewith to inhibit upward vertical movement of the stern roller carriage 602 and prevent the carriage from rising off tracks 614.

A transverse carriage member 624 rigidly connects carriage side frame members 618a, 618b. A pair of pivot bracket assemblies 626 are fixed to transverse carriage member 624 and between them pivotably support a roller bed 628 for movement about a pivot axis 629. The roller bed 628 mounts a pair of horizontal axis pipe support rollers 630 at axially opposite ends substantially radially equidistant from the pivot axis 629 of the bed 628.

A pair of vertical carriage members 632 are fixed to and supported on transverse carriage member 624. Vertical carriage frame members 632 are further connected by upper and lower transverse roller supports 634. Roller supports 634 support a pair of vertical axis rollers 636 in transverse spaced-apart relation.

A further horizontal axis roller 638 is mounted on a sternward extending roller frame support 639 above rollers 630. Looking aft (see FIG. 7A) rollers 630, 636, and 638 define a pipe passage window 640 through the pipe guide assembly 60. Pipe being spooled onto the reel 202, or being unspooled therefrom, passes through the pipe guide assembly 60 and more particularly through the window 640.

It is contemplated, in an alternative embodiment (not shown), that rollers 630 could be replaced by a single roller located at the pivot axis of bed 628, or at any other convenient location on bed 628; in the latter case, the bed 620 preferably is pivotable. The arrangement of a pair of pipe support rollers 630 on a pivotable bed 628 is particularly advantageous in that the pipe passing through the window 640 will substantially always be supported by two reaction points (rollers 630a, 630b) so that the pipe will remain within its elastic range and overbend or pipe buckling will be avoided as much as possible. Vertical axis rollers 636 and upper horizontal axis roller 638 act as guides to prevent the pipe from becoming substantially misaligned as it leaves the pipe laying vessel.

Preferably the surfaces of rollers 630, 636, 638 are made of or covered with material (advantageously an elastomer) which is softer than the coating on the pipe;

this prevents damages to the pipe coating as pipe is paid out through the pipe guide assembly.

Straightener-Pipe Guide Linkage Mechanism

Under some conditions, the forces imparted by the pipe itself may be sufficient to cause the pipe guide assembly to move transversely substantially with movement of the straightener assembly. Alternatively, and to ensure such correspondence of movement between the pipe guide carriage 602 and the straightener 460, the straightener cart 450 and the pipe guide carriage 602 are physically linked.

Figure 8:
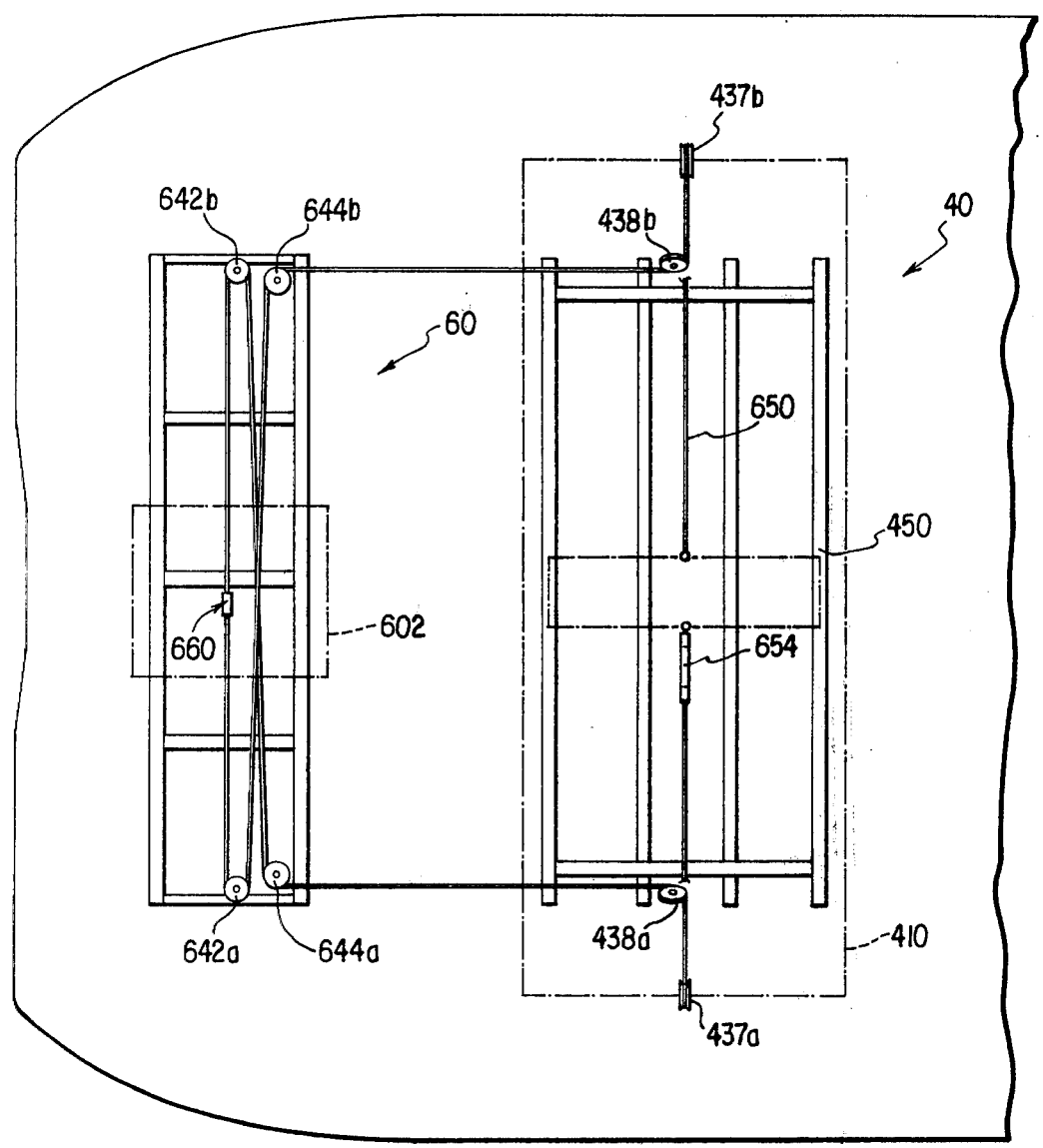
FIG. 8 is a plan view of the straightener and pipe guide assemblies linkage mechanism.

FIG. 8 shows the linkage mechanism between the straightener assembly 40, and most particularly the straightener cart 450, and the pipe guide carriage 602.

As part of such linkage mechanism, upper port and starboard support assembly frame members 417 of straightener assembly 40 mount sheaves (see FIG. 5). The rotational axis of each of sheaves 437 is parallel to the long axis of frame members 434. A pair of lower sheaves 438 are secured to the bottom of frame members 419 parallel to top frame members 434 and extending between bottom frame members 418. Sheaves 438 are mounted at an angle to the vertical approximately the same as the angle which connecting members 422 make with the vertical.

Each of starboard and portside end frame members 613 of pipe guide assembly 60 mount an upper sheave 642 and a lower sheave 644 (see FIG. 7). A pair of cableways 646, advantageously comprising short lengths of pipe, are located at transverse opposite end portions of frame member 612a. A linkage mechanism cable clamp 660 is fixed to the underside of and hangs downwardly from transverse pipe guide carriage frame member 624. The cable clamp assembly 660 advantageously comprises a pair of downwardly extending side members 662; a transverse plate 664 is fixed (e.g., by welding) to the side members 662. A removable plate 666 is boltable to transverse member 664. Side members 662 have groves formed at their bottom portions to allow passage therethrough of a cable 650. A cable 650 is connected at one end to the (e.g., port side of) straightener cart 450; cable 650 is trained around (in succession) sheaves 437b, 438b, 644b, and 642a, passes through clamp 660 and then around sheaves 642b, sheave 644a, sheave 438a, and sheave 437a; cable 650 is connected at its other end through a turnbuckle 654 to the (starboard side of) straightener cart 450.

After the pipe guide carriage 602 and the pipe straightener 460 have been aligned with each other and the linkage cable 650 has been pre-tensioned to the desired amount, plates 666 and 664 are bolted together to tightly clamp cable 650 therebetween. By this linkage arrangement, a positive driving force is exerted on the pipe guide assembly through the cables 650 and 652 as the straightener cart (and, thus, the straightener 450) are moved transversely across the deck of the pipelaying vessel in a direction substantially parallel to the rotational axis of the reel 202.

Figure 9:
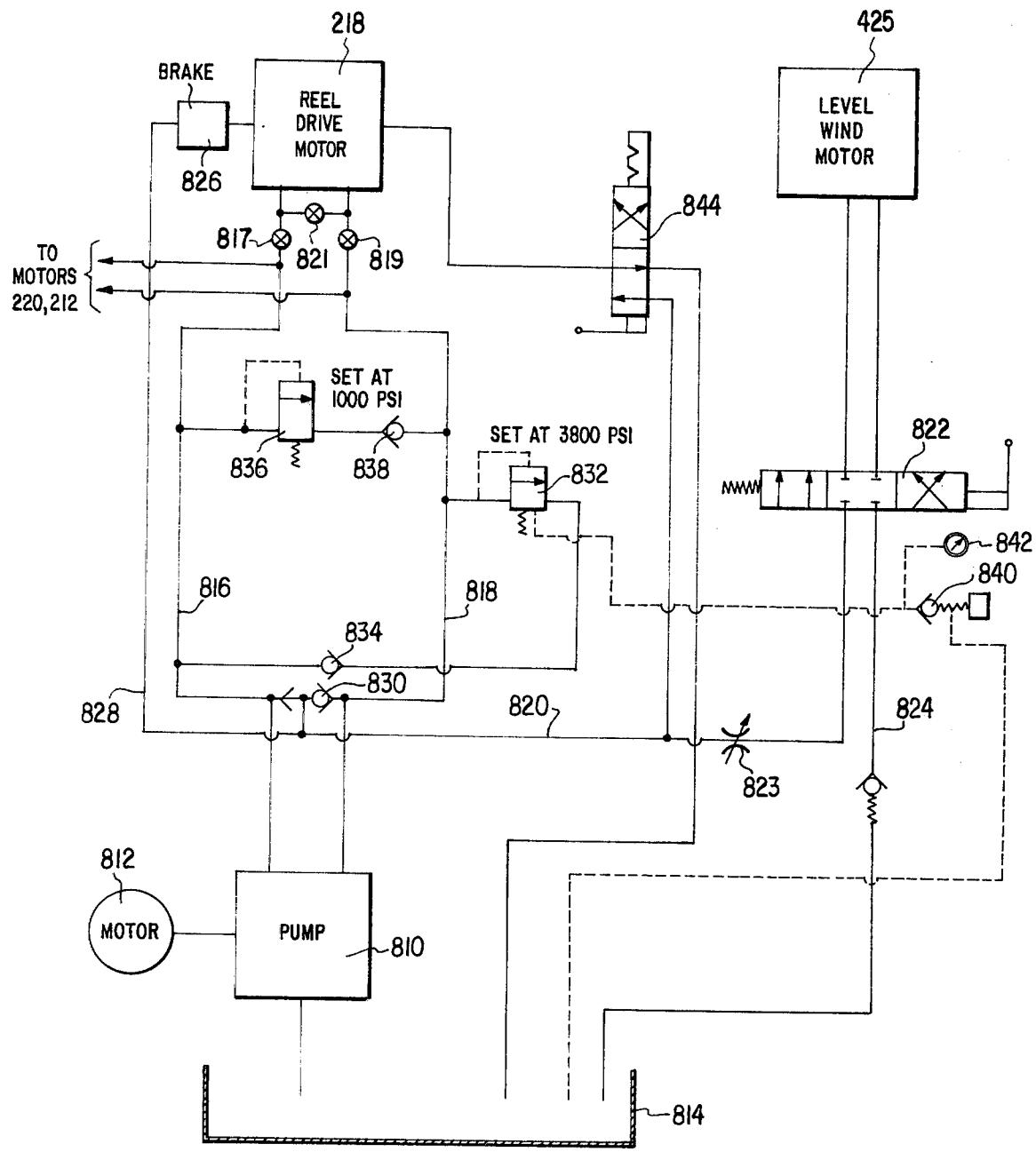
FIG. 9 is a schematic drawing of the reel and level winder/straightener drive system.

Reel and Level Winder/Straightener Drive System (FIG. 9)

The operational embodiment of the invention described herein incorporates an hydraulic drive arrangement. The invention per se is not limited to the use of hydraulic drive; however, it has been found that hydraulic motors are particularly suitable because of their high torque capability at low speed. The reel drive mechanism also incorporates an automatic tension control feature (described in more detail below) which maintains a relatively constant tension on the pipe, particularly during a lay operation, but which may be utilized as well during retrieval operations.

The system for driving the reel 202 in a spooling mode and for maintaining tension on the pipe (through the reel) in an unspooling mode includes the drive motors 218, 220, 222. These are preferably hydraulic motors (e.g., Hagglunds 3000 Psi 0–65 RPM Hydraulic motors) capable of two-speed operation. The reel drive motors are connected in parallel through fluid lines to variable volume hydraulic pumps located in the straightener platform housing.

FIG. 9 shows a simplified schematic of the hydraulic system used in the preferred embodiment of this invention for driving the reel during a spooling operation, for braking the reel during a pipe laying operation, and for driving the level winder during spooling and/or laying operations. Hydraulic pump 810 (e.g., Sunstrand PU25-2046 equipped with a pressure compensator) is driven by, for example, a diesel engine 812. It should be noted that only one pump is required to operate the system at its maximum rated capacity, speed, and torque. A second pump (not shown) may be provided as a backup. In such case, the outputs of the main and back-up pumps are connected in parallel so that the back-up pump can be brought "on-line" in the event of failure of the main pump 810, with a minimum of delay or adverse effect on the operation in progress.

Pump 810 is connected to the reel drive motors 218, 220, 222 through a pair of high pressure hydraulic fluid conduits 816, 818. The reel drive motors are connected in parallel to conduits 816, 818 through respective shutoff valve groups 817, 819, 821; for convenience only motor 218 is shown in FIG. 9.

A reservoir 814 provides storage volume for the hydraulic fluid. During the spooling on operation, diesel engine 812 drives pump 810 so that hydraulic fluid flows out of the pump through supply conduit 816, through reel drive motor 218, and through return conduit 818 back to the pump 810. Thus it will be seen that motor 218 is connected to pump 810 in a closed loop system. A branch line 820 supplies hydraulic fluid to the level wind motor 425 through a directional control valve 822 and a flow control valve 823 located on the operator's control panel 423a. A return conduit 824 completes the fluid flow circuit from the pump 810, through the level wind motor motor 425 to the reservoir 814.

The reel drive motor 218 is provided with a hydraulic brake 826 of the "fail-on" type. The brake is normally spring-biased into a locking position to prevent rotation of motor 218. Hydraulic fluid supplied from the pump output through a conduit 828 acts against the spring force to release the brake and unlock the motor during normal operation.

Conduits 820 and 828 are connected in common to a shuttle valve 830; this valve connects the brake and level wind motor circuits to one of conduits 816 and 818 which is carrying the highest pressure hydraulic fluid supply. In the spooling on mode, supply conduit 816 carries fluid from pump 810 at a higher pressure than return conduit 818; in the laying mode, motor 218 provides the source of high pressure fluid through return conduit 818.

A torque control relief valve 832 is connected between the return conduit 818 and the supply conduit 816 through a check valve 834. Additional relief valves and/or check valves may be added in parallel as needed to accommodate the pressure requirements of the system. A further relief valve 836 is connected through a check valve 838 between the supply conduit 816 and the return conduit 818. In the operative embodiment, relief valve 832 is adjustable up to a maximum relief pressure of about 3800 psi; valve 836 is pre-set to open at about 1000 psi.

A braking pressure control valve 840 located on the operator's console is connected to the torque control relief valve 832 to control the pressure setting of the relief valve. This in turn controls the torque provided by motor 218, particularly in its dynamic braking mode during unspooling. A multiscale gauge 842 is connected in the pressure relief valve setting circuit; gauge 842 provides the operator with the system pressure and the amount of line pull (i.e., pipe tension) with respect to the diameter of the wrap being made. A first scale is calibrated for system pressure, a second scale is calibrated for line pull at full drum (i.e., tension on the pipe when the drum is full), a third scale reads line tension when the drum is at one-half capacity and a fourth scale reads line tension when the drum is substantially empty.

A control valve 844 located on the operator's console controls the flow of hydraulic fluid to the reel drive motor. The control valve 844 is a three position valve; in the first position, the motors will rotate the reel in the "reel on" direction at maximum torque; in the second position, the pump is stroked to zero volume and rotation of the reel is stopped. In its third position, valve 844 reduces the displacement of motor 218 by 50%; this increases the rate at which the motors will rotate for a given amount of oil being pumped but also reduces their torque capability for a given pressure setting by 50%.

Flow control valve 823 interposed in flow line 820 controls the flow of fluid to level wind motor 425 to thereby control the speed at which motor 425 rotates.

System Operation

In the spooling or reeling on mode, the control valve 844 is moved to its first position; the reel drive motor 218 will therefore be driven by pump 810 at full torque. The pump also supplies fluid under pressure to the level wind motor 425 through directional control valve 822 and flow control valve 823. By controlling the volume of fluid supplied to the level wind motor 425, by means of control valve 823, the operator can control the movement of the level winder 450 as it traverses the carrier vessel deck in a direction substantially parallel to the rotational axis of the reel. The operator can thereby control the wrapping of the pipe onto the reel.

When a full complement of pipe is spooled on the reel, an operation which is usually and preferably carried out at a shore base, the carrier vessel (e.g., supply boat) moves to the job site. There, the free end of the pipe is secured to a fixed point, e.g., it may be welded to the end of a previously laid pipe, or it may be connected to a flow terminal at a drilling rig, etc. Once the free end of the pipe is secured, the carrier vessel moves off along the lay path and the pipe is pulled off the reel and through the straightener 460. The main engines of the carrier vessel provide the forward thrust, against which the reel drive motors work to maintain the pipe under tension as it is unspooled.

The adjustable roll 474 of the straightener 460 is set to apply a predetermined amount of reverse bending force and displacement to the pipe as it passes through the straightener. This bending force, coupled with the tension maintained on the pipe, causes the pipe to be straightened as it exits the straightener assembly 40 and passes through the stern roller assembly 60 into the water at the pre-set exit angle $\beta$.

As pipe is unspooled, the reel and reel drive motor 218 rotate in the opposite direction from the reeling-on mode. The amount of tension maintained on the pipe as it comes off the reel is controlled by the dynamic braking action of motor 218 reacting against the forward thrust of the vessel, and specifically by the amount of torque applied by the motor to the reel in the opposite direction to the direction of unspooling rotation. The motor torque is in turn controlled by the pressure setting of relief valve 832, as set by control valve 840.

During the laying operation, the pump 810 is maintained in a pumping mode; however, the reel motor 218 is driven by the reel as pipe is pulled off. The motor 218 therefore acts as a pump, by pumping high pressure hydraulic fluid through return conduit 818, over the torque control relief valve 832 and into supply conduit 816 through check valve 834. Relief valve 836 is provided to prevent the pressure in supply conduit 816 from becoming too great during the braking mode. Valve 836 is pre-set to release at a desired pressure (e.g., 1000 psi) to thereby short circuit the flow of flud between the supply conduit 816 and return conduit 818; valve 836 will close when the pressure in supply conduit 816 decreases below its release point.

System pressure can be adjusted by removing one or more reel drive motors from the operating circuit. This will increase the pressure available to drive the remaining on-line reel drive motors and the level winder motor. An alternative method of adjusting system pressure is by moving control valve 844 from its first to its third positions; this reduces the displacement of the reel drive motors by 50% and increases the pressure available to drive the level winder motor during a spooling operation. During a laying operation, this reduction in displacement results in a decrease in line tension on the pipe and is required where line tension is excessive even at minimum system pressure settings on relief valve 832.

In the laying mode, the closed loop dynamic braking system maintains a constant tension on the pipe as it is spooled off the reel. Such tension is adjustable, for example, between 0 and 70,000 pounds in combination with laying speed, which is adjustable, for example, between 0 and 10,000 feet per hour. This enables the proper catenary to be maintained on the pipe between its entry point into the water and its touchdown point on the ocean bottom. This is important to avoid excessive bending of the pipe so that the radius of curvature of the catenary does not fall below the elastic limit of the pipe.

During the laying operation, surface action of the sea will result in back and/or down surging of the carrier vessel. Such action tends to decrease the tension on the pipe, resulting in changes to the pipe geometry and particularly the catenary. When the constant tension adjustment feature senses a decrease in line pull, due to back or down surging, the system automatically increases the pumping pressure on the motor to increase the braking force on the drum and thereby increase the tension on the pipe.

In order to achieve the automatic tension adjustment to maintain a constant tension on the pipe, the pump 810 is set for maximum pumping volume. The fluid pressure supplied to the drive motor 218 by pump 810 through conduit 816 cannot exceed the pressure setting of relief valve 836. This provides a constant pressure supply to the input of the reel drive motors and the braking torque against which the reel acts. During the laying operation, the reel torque overcomes the driving force of the fluid pressure in supply conduit 816. The drive motors 218, 220, 222 are rotated by the driving force of the reel against the dynamic braking force of the fluid supplied by pump 810. The drive motors thus act as a pump in the manner described above.

If during a laying operation, a back or down surge occurs, the line tension, and thus the torque exerted by the reel on the drive motor, drops significantly, with a corresponding drop in fluid pressure pumped by the motor. This slack is taken up by the fluid pressure supplied by pump 810 to increase the torquing force exerted by the motor on the reel in the opposite direction to the torquing force exerted by the reel on the motor. A proper balance of torquing forces will therefore be maintained as line tension changes due, for example, to sea condition changes.

With the present invention, pipe can be "overwound" or "underwound" on the reel. That is, pipe can be spooled onto the reel from the top (in the overwound mode) or from the bottom (in the underwound mode). When unspooling from the overwound configuration, the pipe describes an upwardly curving parabola as shown in the drawing. When unspooling from the underwound mode, the pipe exits the reel from the bottom and travels upwardly to the straightener mechanism 460. The pipe will first contact rollers 487a and 487b which, particularly in the underwound mode, act as a curve uniformizer to impart a uniform radius of curvature to the pipe in the opposite direction to the spool imparted radius of curvature. The principle of operation of such a curve uniformizer is known; see, for example, U.S. Pat. No. 3,712,100, issued Jan. 23, 1973 to Key et al.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A method for laying a continuous length of pipe on the sea bottom from a carrier vessel, in which a pipe carrying reel is rotatably mounted on a carrier vessel, reel drive motor means are coupled to the reel for driving the reel to spool up pipe in a spooling mode and for providing a dynamic braking force to the reel in an unspooling mode as pipe is unspooled from the reel, pipe straightener means are mounted to the carrier vessel downstream of the reel in the direction of unspooling for movement in a direction substantially parallel to the rotational axis of the reel, and pipe guide means are mounted to the carrier vessel downstream of the straightener means in the direction of pipe unspooling for movement in a direction substantially parallel to the rotational axis of the reel, said method comprising the steps of:

sensing changes in tension on the pipe as it is being unspooled as a function of corresponding changes in torque on the reel drive motor means in its dynamic braking mode; and automatically adjusting the torque imparted to the reel by the reel drive motor means to maintain a balance between the torque applied to the reel by the reel drive motor means and the torque applied to the reel drive motor means by the reel to thereby maintain a substantially constant tension on the pipe in the unspooling mode.

2. A method according to claim 1, wherein said reel drive motor means comprises one or more hydraulic motor means, the method comprising the further steps of:

providing a substantially constant external source of hydraulic fluid under pressure to the drive motor means in the unspooling mode; and regulating the output pressure of the drive motor means in its dynamic braking mode to thereby maintain a relatively constant output pressure from the drive motor means and a relatively constant tension on the pipe in the unspooling mode.

3. A method according to claim 2, further comprising the step of;

dumping excess hydraulic fluid from the drive motor system when the output pressure of the drive motor means in the dynamic braking mode exceeds a predetermined maximum pressure to thereby maintain the dynamic braking force of the drive motor means at or below a level which produces a maximum desired tension on the pipe in the unspooling mode.

4. A method according to claim 2 or 3, further comprising:

adding hydraulic fluid to the drive motor systm when the output pressure of the drive motor means in the dynamic braking mode falls below a predetermined minimum pressure to thereby maintain the dynamic braking force of the drive motor means at or above the level which produces a minimum desired tension on the pipe on the unspooled mode.

* * * * *

UNITED STATES PATENT AND TRADEMARK OFFICE
CERTIFICATE OF CORRECTION

PATENT NO. : 4,260,287
DATED : April 7, 1981
INVENTOR(S) : Stanley T. Uyeda; John Cha It is certified that error appears in the above-identified patent and that said Letters Patent are hereby corrected as shown below:

Column 9, line 9, "426b" should be --416b--.

Column 14, line 49, "motor motor" should be --motor--.

Column 16, line 26, "flud" should be --fluid--.

Signed and Sealed this

Fifteenth Day of December 1981

[SEAL]

Attest:

GERALD J. MOSSINGHOFF

Attesting Officer

Commissioner of Patents and Trademarks